US009858849B2

(12) United States Patent
Tamaki

(10) Patent No.: US 9,858,849 B2
(45) Date of Patent: *Jan. 2, 2018

(54) DISPLAY APPARATUS WITH TRANSMISSIVE AND REFLECTIVE SUBPIXELS

(71) Applicant: Japan Display Inc., Tokyo (JP)

(72) Inventor: Masaya Tamaki, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,964

(22) Filed: Sep. 15, 2016

(65) Prior Publication Data

US 2017/0018218 A1 Jan. 19, 2017

Related U.S. Application Data

(63) Continuation of application No. 14/719,601, filed on May 22, 2015, now Pat. No. 9,478,158, which is a continuation of application No. 13/449,542, filed on Apr. 18, 2012, now Pat. No. 9,070,330.

(30) Foreign Application Priority Data

Apr. 28, 2011 (JP) ................. 2011-100516

(51) Int. Cl.
*G09G 3/36* (2006.01)
*G09G 3/20* (2006.01)
*G02F 1/1362* (2006.01)

(52) U.S. Cl.
CPC ......... *G09G 3/2003* (2013.01); *G09G 3/2074* (2013.01); *G09G 3/3607* (2013.01); *G09G 3/3677* (2013.01); *G09G 3/3688* (2013.01); *G02F 1/13624* (2013.01); *G02F 2001/136222* (2013.01); *G09G 3/3648* (2013.01);
(Continued)

(58) Field of Classification Search
CPC .... G02F 2201/52; G02F 2001/136222; G09G 3/2003; G09G 3/2074; G09G 2300/0456
USPC ........................................... 345/88
See application file for complete search history.

(56) References Cited

U.S. PATENT DOCUMENTS

| 6,100,861 | A | 8/2000 | Cohen et al. |
| 7,808,466 | B2 | 10/2010 | Morimoto et al. |
| 8,502,839 | B2 | 8/2013 | Tseng et al. |

(Continued)

FOREIGN PATENT DOCUMENTS

| JP | 2955227 | 7/1999 |
| JP | 2004-198792 | 7/2004 |

(Continued)

OTHER PUBLICATIONS

Chinese Office Examination report issued in connection with counterpart Chinese Patent Application No. CN 201210116650.3 dated Jul. 1, 2015 with English translation.

(Continued)

*Primary Examiner* — Yuzhen Shen
(74) *Attorney, Agent, or Firm* — Dentons US LLP

(57) ABSTRACT

A display apparatus including a display section including an array of pixels in a two-dimensional matrix, wherein each of the pixels of the display section includes a pair of a subpixel displaying a first primary color, and a subpixel displaying a second primary color being different from the first primary color.

12 Claims, 23 Drawing Sheets

(52) U.S. Cl.
CPC ............... *G09G 2300/0452* (2013.01); *G09G 2300/0456* (2013.01)

(56) References Cited

U.S. PATENT DOCUMENTS

| | | |
|---|---|---|
| 9,070,330 B2 | 6/2015 | Tamaki |
| 2004/0252262 A1* | 12/2004 | Park .................. G02F 1/133555 349/114 |
| 2005/0140622 A1 | 6/2005 | Lee et al. |
| 2005/0243047 A1 | 11/2005 | Asao |
| 2006/0187386 A1* | 8/2006 | Roh .................. G02F 1/133555 349/114 |
| 2006/0284811 A1 | 12/2006 | Huang |
| 2007/0063945 A1* | 3/2007 | Hung .................. G09G 3/3607 345/88 |
| 2007/0146242 A1 | 6/2007 | Miller et al. |
| 2007/0205972 A1 | 9/2007 | Asao et al. |
| 2008/0084376 A1 | 4/2008 | Hirota et al. |
| 2008/0136982 A1* | 6/2008 | Watanabe ......... G02F 1/133371 349/37 |
| 2008/0218461 A1 | 9/2008 | Sugita et al. |
| 2008/0316401 A1* | 12/2008 | Chang ............... G02F 1/133514 349/114 |
| 2009/0059135 A1* | 3/2009 | Park .................. G02F 1/133555 349/96 |
| 2009/0059341 A1 | 3/2009 | Kiugawa et al. |
| 2010/0118220 A1* | 5/2010 | Jang .................... G09G 3/3648 349/39 |

FOREIGN PATENT DOCUMENTS

| | | |
|---|---|---|
| JP | 2005-316203 | 11/2005 |
| JP | 2009-075547 | 4/2009 |
| WO | WO/2009/025053 | 2/2009 |

OTHER PUBLICATIONS

Partial European Search Report issued on Aug. 7, 2012 in connection with counterpart European Patent Application No. EP 12164739.

Japanese Office Examination Report issued in connection with related Japanese Patent Application No. JP 2011-100516 dated May 20, 2014.

* cited by examiner

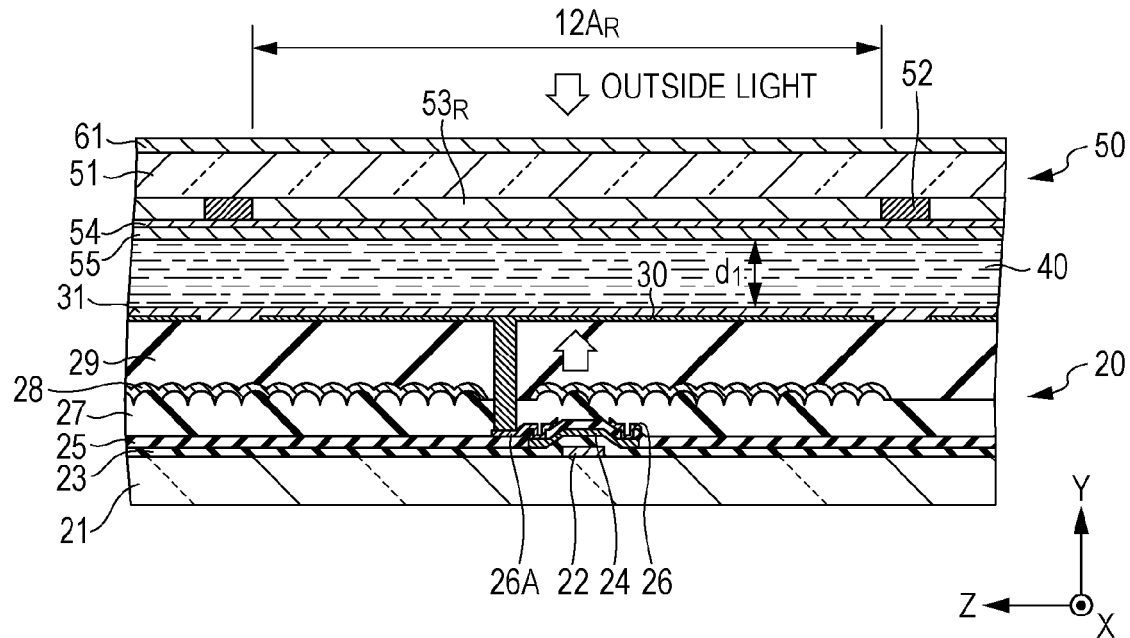
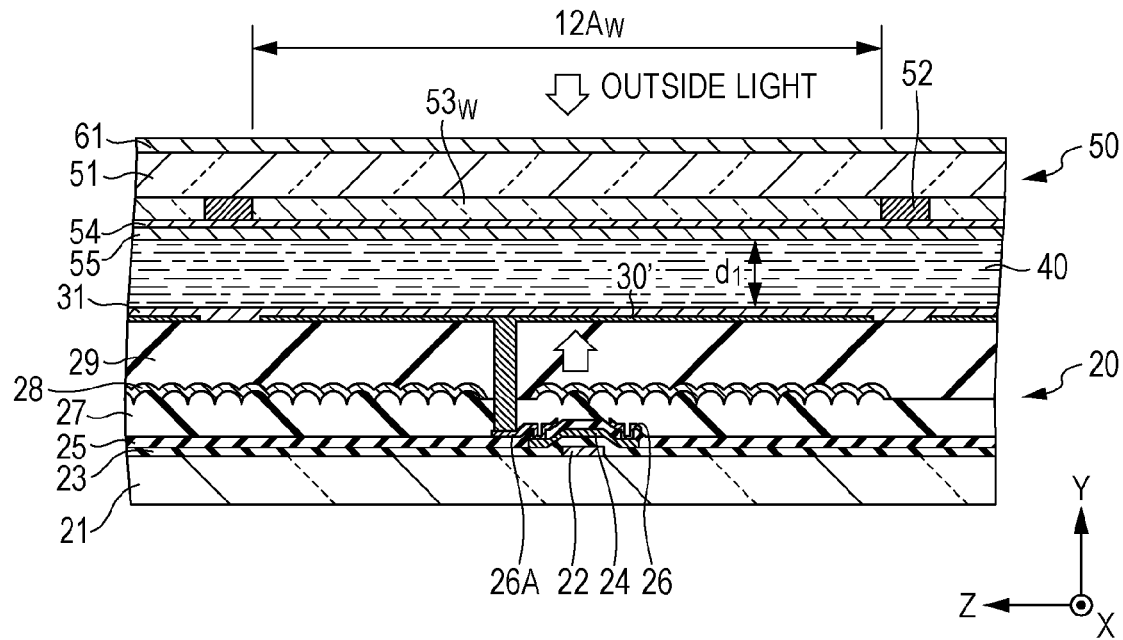

FIG. 10
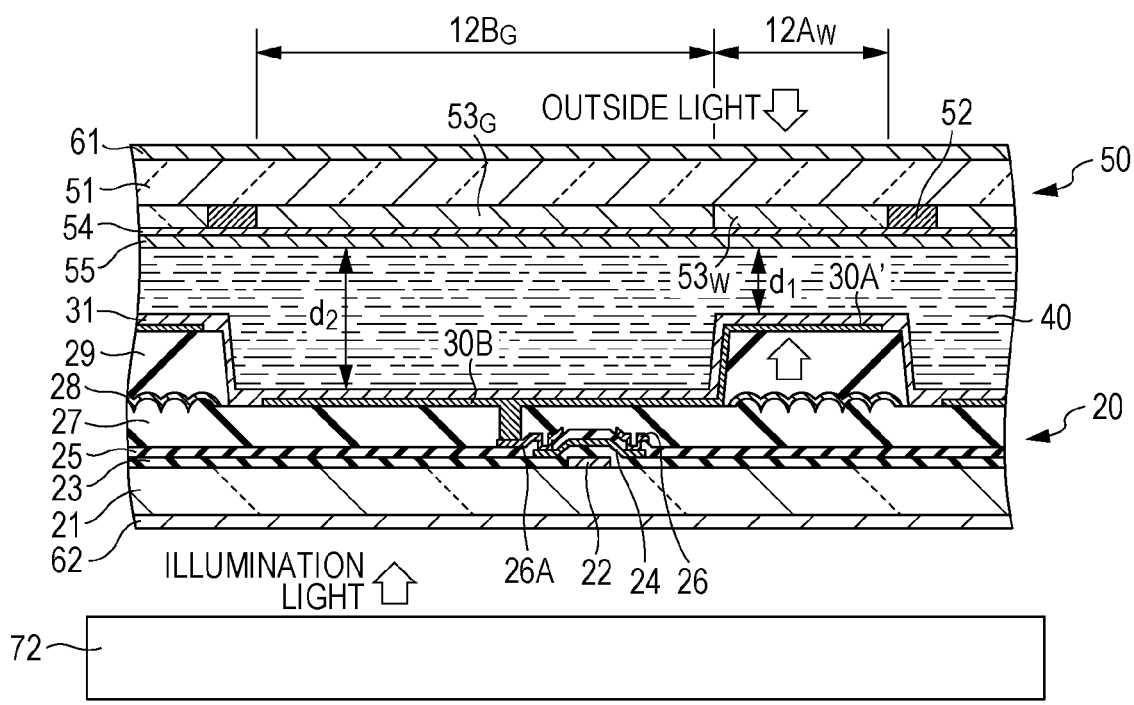
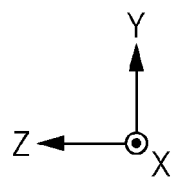

FIG. 23
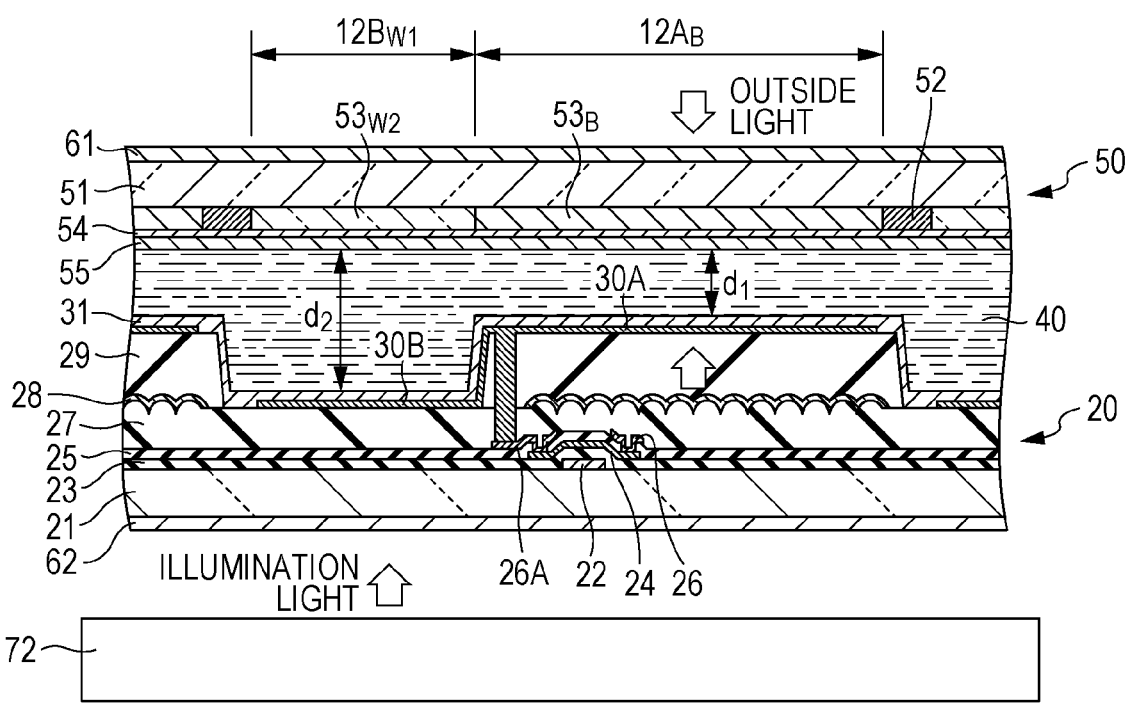
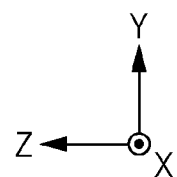

DISPLAY APPARATUS WITH TRANSMISSIVE AND REFLECTIVE SUBPIXELS

RELATED APPLICATION DATA

This application is a continuation of U.S. patent application Ser. No. 14/719,601 filed May 22, 2015, which is a continuation of U.S. patent application Ser. No. 13/449,542 filed Apr. 18, 2012, now U.S. Pat. No. 9,070,330 issued Jun. 30, 2015, the entireties of which are incorporated herein by reference to the extent permitted by law. The present application claims the benefit of priority to Japanese Patent Application No. JP 2011-100516 filed on Apr. 28, 2011 in the Japan Patent Office, the entirety of which is incorporated by reference herein to the extent permitted by law.

BACKGROUND

The present disclosure relates to a display apparatus.

Reflective display apparatuses, which display images by controlling a reflection factor of outside light, and transmissive display apparatuses, which display images by controlling a transmission factor of light from backlight disposed at a back face, have become familiar as display apparatuses, for example. Also, proposals have been made of, for example, transflective display apparatuses, which include reflective subpixels and transmissive subpixels, and function as display apparatuses having advantages of both the reflective display apparatuses and the transmissive display apparatuses (for example, refer to Japanese Patent No. 2955277).

Normally, a display apparatus performing color display includes pixels including a set of subpixels displaying the three primary colors, namely, red, green and blue. The display apparatus displays color images by controlling luminance of the individual subpixels.

SUMMARY

For example, in a transflective color display apparatus designed with priority given to display of a transmissive section, a ratio of an area occupied by reflective subpixels in a pixel is small. In this display apparatus, luminance of images reflected by outside light becomes low, and thus visibility of the images is decreased. In such a case, the visibility will be improved by suppressing color reproduction to a certain degree and displaying images having higher luminance. In this manner, depending on applications of display apparatuses, demands are growing for a display apparatus capable of displaying images having higher luminance while ensuring a certain degree of color gamut.

Accordingly, it is desirable to provide a display apparatus capable of displaying images having higher luminance while ensuring a certain degree of color gamut.

According to an embodiment of the present disclosure, there is provided a display apparatus including a display section including an array of pixels in a two-dimensional matrix, wherein each of the pixels of the display section include a pair of a subpixel displaying a first primary color, and a subpixel displaying a second primary color being different from the first primary color.

According to another embodiment of the present disclosure, there is provided a display apparatus including a transflective display section including, in a two-dimensional matrix, an array of pixels including a pair of a transmissive subpixel for displaying red color, a transmissive subpixel for displaying green color and a transmissive subpixel for displaying blue color, and a reflective subpixel for displaying red color and a reflective subpixel for displaying white color or cyan.

Further, according to another embodiment of the present disclosure, there is provided a display apparatus including a transflective display section including, in a two-dimensional matrix, an array of pixels including a pair of a reflective subpixel for displaying red color, a reflective subpixel for displaying green color and a reflective subpixel for displaying blue color, and a transmissive subpixel for displaying red color and a transmissive subpixel for displaying white color or cyan.

In a display apparatus according to an embodiment of the present disclosure, each of the pixels include a pair of a subpixel displaying a first primary color, and a subpixel displaying a second primary color being different from the first primary color. Thereby, it is possible to display images having higher luminance while ensuring a certain degree of color gamut. A display apparatus according to another embodiment of the present disclosure includes a subpixel for displaying red color and a subpixel for displaying white color or cyan as reflective subpixels. Thereby, in an image displayed by reflection of outside light, it is possible to display images having higher luminance while ensuring a certain degree of color gamut. A display apparatus according to still another embodiment of the present disclosure includes a subpixel for displaying red color and a subpixel for displaying white color or cyan as transmissive subpixels. Thereby, in an image displayed by light transmission, it is possible to display images having higher luminance while ensuring a certain degree of color gamut.

BRIEF DESCRIPTION OF THE DRAWINGS

FIG. 4A is a schematic sectional view of the display section taken on line IVA-IVA of FIG. 3;

FIG. 4B is a schematic sectional view of the display section taken on line IVB-IVB of FIG. 3;

FIG. 10 is a schematic sectional view of the display section taken on line X-X of FIG. 8;

FIG. 23 is a schematic sectional view of the display section taken on line XXIII-XXIII of FIG. 22.

DETAILED DESCRIPTION OF EMBODIMENTS

Figure 1:
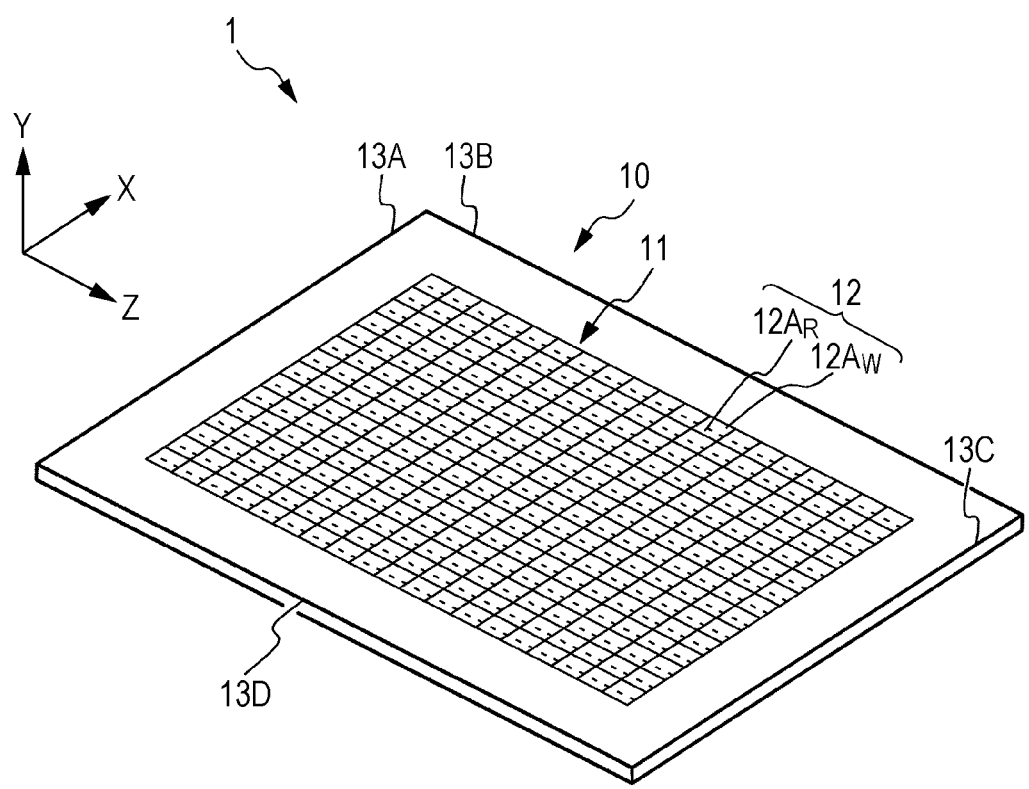
FIG. 1 is a schematic perspective view of a display apparatus according to a first embodiment.

In the following, a description will be given of the present disclosure on the basis of embodiments with reference to the drawings. The present disclosure is not limited to the embodiments, and various numeric values and materials in the embodiments are described as an example. In the following description, a same reference numeral is given to a same component or a component having a same function, and thus a duplicated description will be omitted. In this regard, the descriptions will be given in the following order.

1. Description on display apparatus according to the present disclosure in general
2. First Embodiment
3. Second Embodiment
4. Third Embodiment
5. Fourth Embodiment
6. Fifth Embodiment (the others)

Description on Display Apparatus According to the Present Disclosure in General

In a display apparatus according to an embodiment of the present disclosure, it is desirable to determine the first primary color to be a color having high chroma and brightness basically. Above all, it is desirable to determine the first primary color to be red. In this case, it is desirable to determine the second primary color to be white or cyan.

In a display apparatus according to an embodiment, which includes the above-described preferable configuration, it is possible to employ a configuration in which a subpixel displaying the first primary color is driven using a video signal for displaying red color, and a subpixel displaying the second primary color using a video signal for displaying green color. In this regard, in the present specification, "using a video signal" includes a configuration of using a signal that is produced by processing a video signal in addition to using the video signal without change. For example, it is possible to employ a configuration in which a subpixel displaying the second primary color is driven using the video signal for displaying green color without change, or to employ a configuration in which a subpixel displaying the second primary color is driven using a signal produced by processing the video signal for displaying green color, etc.

In the display apparatus according to the embodiment, which includes the above-described various preferable configurations, for the display section, it is possible to use a widespread display panel, such as a liquid-crystal display panel, an electro-luminescence display panel, a plasma display panel, an electronic paper (for example, electrophoretic type), or the like. Among these, it is desirable to employ a display section including a liquid-crystal display panel from a viewpoint of reducing weight of the display apparatus, etc. The configuration of the liquid-crystal display panel is not particularly limited. For example, the liquid-crystal display panel may be reflective type, may be transmissive type, or may be transflective type, which has advantages of both of the former two types.

In a display apparatus according to another embodiment of the present disclosure, it is possible to employ a configuration in which a transmissive subpixel for displaying red color and a reflective subpixel for displaying red color are driven using a video signal for displaying red color, a transmissive subpixel for displaying green color and a reflective subpixel for displaying white color or cyan are driven using a video signal for displaying green color, and a transmissive subpixel for displaying blue color is driven using a video signal for displaying blue color.

Alternatively, in the display apparatus according to another embodiment of the present disclosure, a pixel includes a first reflective subpixel and a second reflective subpixel for displaying white color or cyan, and thus it is possible to employ a configuration in which a transmissive subpixel for displaying red color and a reflective subpixel for displaying red color are driven using a video signal for displaying red color, a transmissive subpixel for displaying green color and a first reflective subpixel for displaying white color or cyan are driven using a video signal for displaying green color, and a transmissive subpixel for displaying blue color, and a second reflective subpixel for displaying white color or cyan are driven using a video signal for displaying blue color.

In a display apparatus according to still another embodiment of the present disclosure, it is possible to employ a configuration in which a reflective subpixel for displaying red color and a transmissive subpixel for displaying red color are driven using a video signal for displaying red color, a reflective subpixel for displaying green color and a transmissive subpixel for displaying white color or cyan are driven using a video signal for displaying green color, and a reflective subpixel for displaying blue color is driven using a video signal for displaying blue color.

Alternatively, in the display apparatus according to still another embodiment of the present disclosure, a pixel includes a first transmissive subpixel and a second transmissive subpixel for displaying white color or cyan, and thus it is possible to employ a configuration in which a reflective subpixel for displaying red color and a transmissive subpixel for displaying red color are driven using a video signal for displaying red color, a reflective subpixel for displaying green color and a first transmissive subpixel for displaying white color or cyan are driven using a video signal for displaying green color, and a reflective subpixel for displaying blue color and a second transmissive subpixel for displaying white color or cyan are driven using a video signal for displaying blue color.

In the above-described preferable configuration according to the other embodiment, or in the above-described preferable configuration according to the still other embodiment, it is possible to use a widespread transflective display panel as the display section. Above all, it is desirable to employ a display section including a transflective liquid-crystal display panel from a viewpoint of reducing weight of the display apparatus, etc. The configuration of the liquid-crystal display panel is not particularly limited.

In the case of using an illumination section irradiating light on the display section, a widespread illumination section can be used. A configuration of the illumination section is not particularly limited. In general, it is possible to configure the illumination section from a widespread member, such as a light source, a light guiding plate, or the like.

In each of the embodiments described later, an active-matrix type color-liquid-crystal display panel is used as the display section.

The liquid-crystal display panel includes, for example, a front panel including a transparent common electrode, a rear panel including a pixel electrode, and a liquid crystal material disposed between the front panel and the rear panel. In the case of a transmissive type, the pixel electrode ought to be formed by a transparent conductive material. Also, in the case of a reflective type, it is possible to form the pixel electrode by a light reflecting material. Alternatively, it is also possible to dispose a light reflecting plate independently of a pixel electrode, and to configure the pixel electrode from a transparent conductive material. This is the same in the case of a transflective type.

An operation mode of the liquid-crystal display panel is not particularly limited. For example, a configuration in which the liquid-crystal display panel is driven in a so-called TN (Twisted Nematic) mode may be employed. Alternatively, a configuration in which the liquid-crystal display panel is driven in a VA (Vertical Alignment) mode, or an IPS (In-Plane Switching) mode may be employed.

More specifically, the front panel includes, for example, a substrate made of glass, a transparent common electrode (for example, made of ITO (Indium Tin Oxide)) disposed on the inner face of the substrate, and a polarizing film disposed on the outer face of the substrate. A color filter covered by an overcoat layer made of acrylic resin or epoxy resin is disposed on the inner face of the substrate. And the front panel has a configuration in which a transparent common electrode is further formed on the overcoat layer. In this regard, an alignment film is formed on the transparent common electrode if necessary.

On the other hand, the rear panel includes, for example, a substrate made of glass, a switching element formed on the inner face of the substrate, a pixel electrode (for example, made of ITO) which is controlled to be conductive or nonconductive by the switching element. If necessary, an alignment film is formed on the whole area including the pixel electrode, and a polarizing film is disposed on the outer face of the substrate.

Various kinds of members and a liquid crystal material included in a liquid-crystal display panel can be made of widespread members and materials. For a switching element, for example, a three-terminal element, such as a thin film transistor (TFT), and a two-terminal element, such as an MIM (Metal Insulator Metal) element, a varistor element, a diode, etc., are given as examples. For example, a scanning line extending in a row direction and a signal line extending in a column direction are connected to these switching elements.

The display section is not limited to a certain shape in particular. The display section may be a horizontally long rectangle in shape, or may be a vertically long rectangle in shape. When the number of pixels, M×N, in the display section is denoted by (M, N), for example, if the display section is a horizontally long rectangle in shape, values of (M, N) are given by (640, 480), (800, 600), (1024, 768), etc., as some examples of image display resolutions. If the display section is a vertically long rectangle in shape, it is possible to exemplify the resolutions by the values that are mutually replaced with each other. However, the resolution is not limited to these values.

It is possible to configure a drive circuit that drives the display section, etc., by various circuits. It is possible to configure the drive circuit using widespread circuit elements, etc.

Various conditions described in the present specification are satisfied if the conditions are substantially met in addition to the case where the conditions are strictly met. For example, it will suffice if "red" is substantially recognized as red, and "green" is substantially recognized as green. This is the same for "blue", "white" and "cyan". Various kinds of variations that arise in design or in production are permissible.

First Embodiment

A description will be given of a display apparatus according to a first embodiment of the present disclosure.

FIG. 1 is a schematic perspective view of a display apparatus according to the first embodiment.

A display apparatus 1 includes a display section 10 including an array of pixels 12 in a two-dimensional matrix. The pixel 12 of the display section 10 includes a pair of a subpixel $12A_R$ displaying a first primary color and a subpixel $12A_W$ displaying a second primary color, which is different from the first primary color. In the first embodiment, the first primary color is red, and the second primary color is white.

Figure 2:
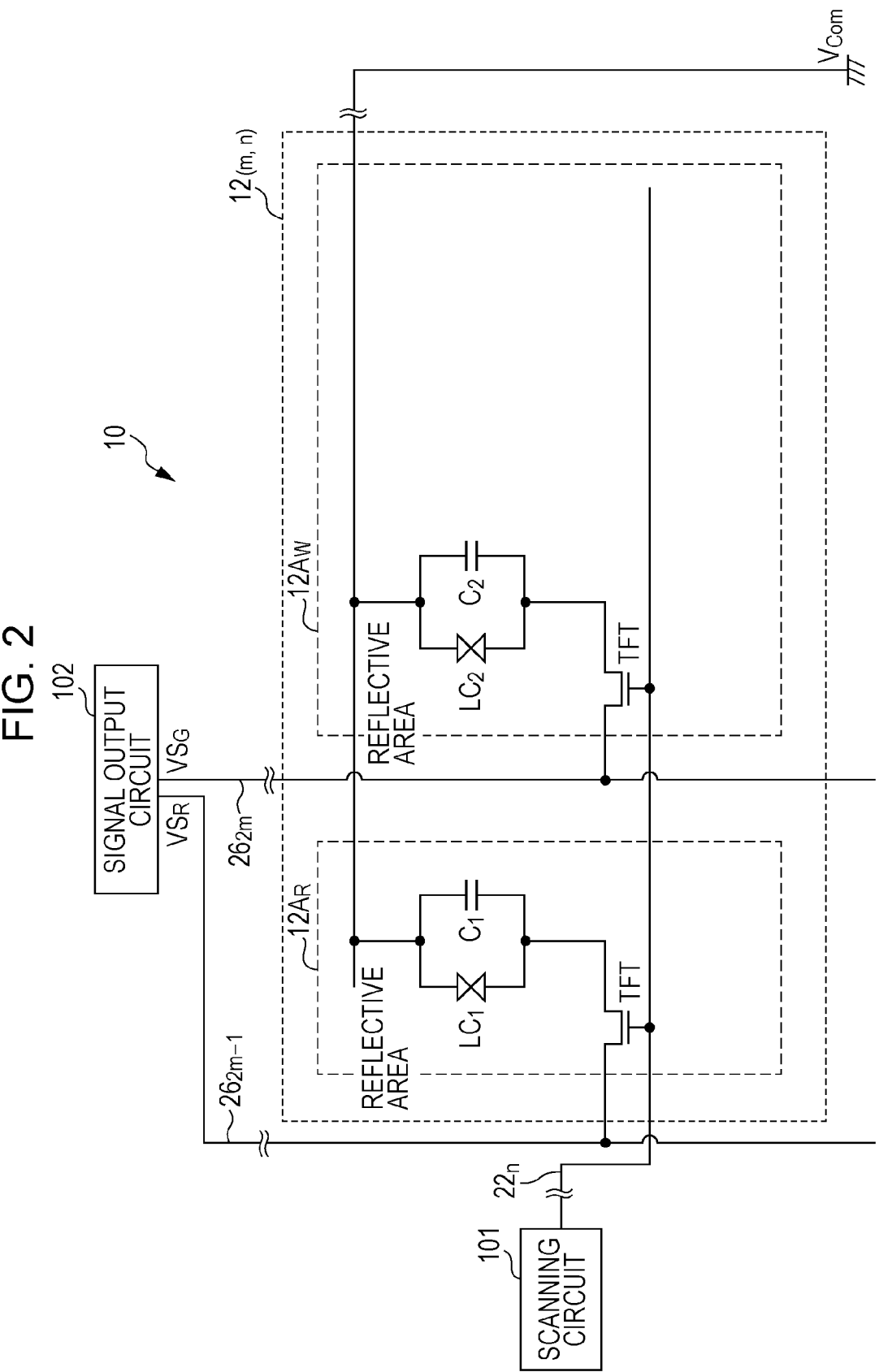
FIG. 2 is a schematic circuit diagram of a display section of a portion including a (m, n)-th pixel.

The display section 10 includes a reflective liquid-crystal display panel. For convenience of explanation, it is assumed that a display area 11 of the display section 10 is parallel to an X-Z plane, and an image observer's side in a +Y direction. In this regard, a scanning circuit 101 and a signal output circuit 102, which are illustrated in FIG. 2 later, are omitted to be illustrated in FIG. 1.

The display section 10 includes a front panel on the +Y direction side in FIG. 1, a rear panel on the −Y direction side, a liquid crystal material disposed between the front panel and the rear panel, etc. In this regard, For convenience of illustration, the display section 10 is illustrated as one piece of panel in FIG. 1. The display section 10 is rectangular in shape, and the display area 11 on which pixels 12 are disposed in an array is also rectangular in shape. Reference numerals 13A, 13B, 13C, and 13D denote sides of the display section 10. This is the same for display sections according to the other embodiments illustrated in FIG. 6 and FIG. 15, which will be described later.

The display area 11 includes the array with M pieces of pixels 12 in a row direction (the X direction in the figure) and N pieces of pixels 12 in a column direction (the Z direction in the figure), namely M×N pieces of the pixels 12 in total. A pixel 12 in the m-th column (note that m=1, 2 . . . , M) and the n-th row (note that n=1, 2 . . . , N) is denoted by a (m, n)-th pixel 12 or a pixel $12_{(m, n)}$. The number of pixels (M, N) of the display section 10 is (768, 1024), for example. This is the same for the display sections in the other embodiments.

In the first embodiment, a pixel 12 includes a pair of reflective subpixels $12A_R$ and $12A_W$. A description will be given of details of the subpixels.

FIG. 2 is a schematic circuit diagram of a display section of a portion including a (m, n)-th pixel.

The display apparatus 1 is a display apparatus that includes N pieces of scanning lines 22, which extend in a row direction and individual one ends of which are connected to the scanning circuit 101, 2×M pieces of signal lines 26, which extend in a column direction and individual one ends of which are connected to the signal output circuit 102, and reflective subpixels $12A_R$ and $12A_W$, which are connected to the individual scanning lines 22 and the individual signal lines 26 and include a transistor (TFT) operating in response to a scanning signal from the individual scanning lines 22.

An n-th row scanning line 22 (hereinafter, sometimes denoted by a scanning line $22_n$) is connected to a pixel $12_{(m, n)}$. A (2×m−1)-th column signal line 26 is connected to a subpixel $12A_R$, and a (2×m)-th column signal line 26 is connected to a subpixel $12A_W$. In this regard, a notation "x" is omitted in FIG. 2. Also, in the descriptions below, the notation "x" is sometimes omitted. For example, the (2×m)-th column signal line 26 is sometimes denoted by a signal line $26_{2m}$.

Liquid crystal capacitors $LC_1$ and $LC_2$, illustrated in FIG. 2, include a transparent common electrode disposed on the front panel, a pixel electrode disposed on the rear panel, and a liquid-crystal material layer sandwiched between the front panel and the rear panel. Also, retention capacitors $C_1$ and $C_2$ are formed by auxiliary electrodes conducted to the pixel electrodes, etc. In this regard, in the following FIG. 3 and FIG. 4, the auxiliary electrodes are omitted to be illustrated.

Signals in accordance with a color image to be displayed are supplied to the display apparatus 1 from the outside. A video signal $VS_R$ for displaying red color and a video signal $VS_G$ for displaying green color are generated by a circuit, not illustrated in the figure, on the basis of the signal according to the color image. And the signal output circuit 102 drives the subpixel $12A_R$ displaying the first primary color using the video signal $VS_R$ for displaying red color, and drives the subpixel $12A_W$ for displaying the second primary color using the video signal $VS_G$ for displaying green color.

Figure 3:
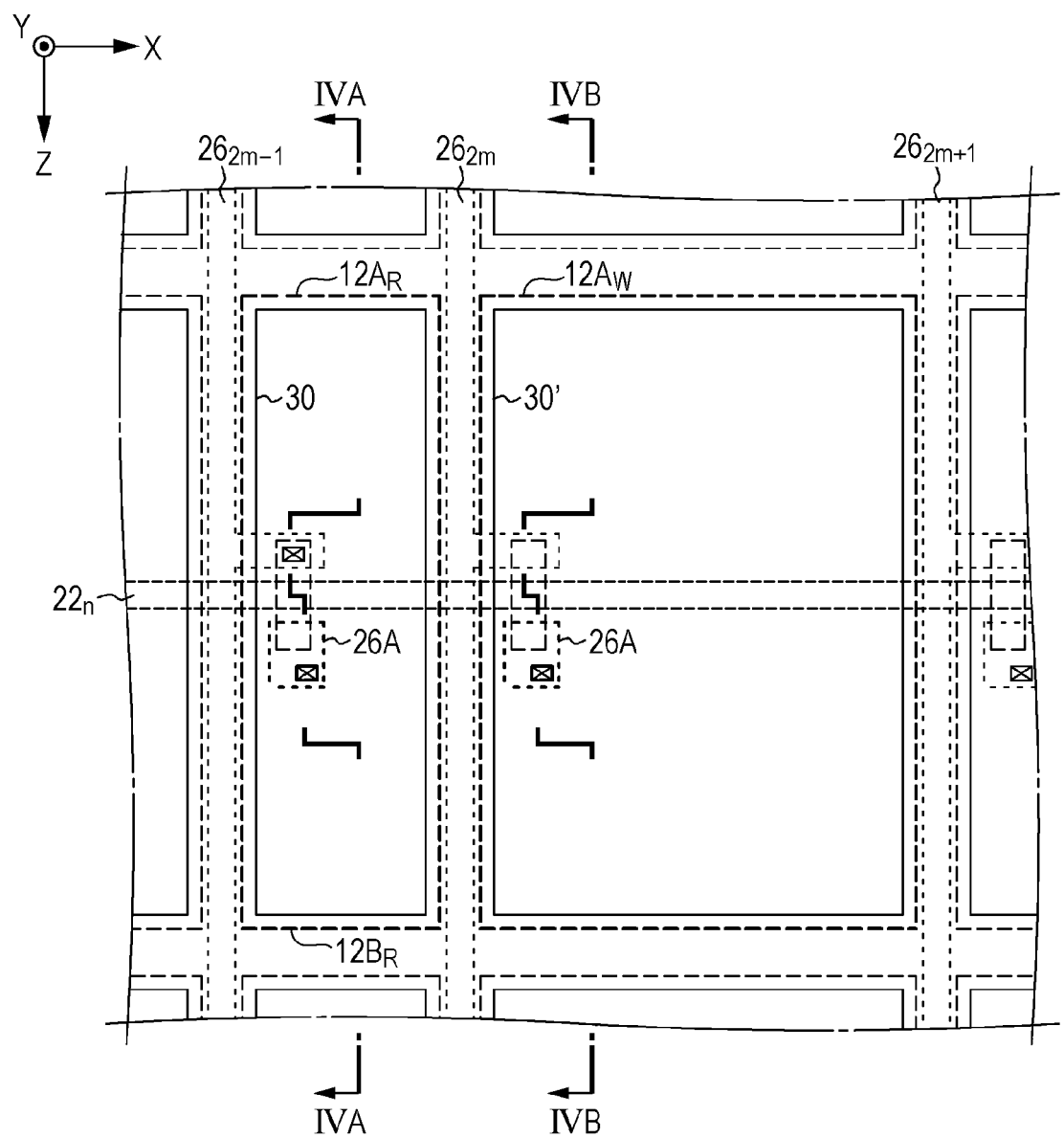
FIG. 3 is a schematic plan view for explaining arrangement of various components in the display section of the portion including the (m, n)-th pixel.

FIG. 3 is a schematic plan view for explaining arrangement of various components in the display section of the portion including the (m, n)-th pixel. FIG. 4A is a schematic sectional view of the display section taken on line IVA-IVA of FIG. 3. FIG. 4B is a schematic sectional view of the display section taken on line IVB-IVB of FIG. 3.

As illustrated in FIG. 3, the subpixel $12A_W$ has a larger area than that of the subpixel $12A_R$. Basically, a preferable value of the occupancy rate ought to be selected depending on design such that an occupancy rate of the subpixel $12A_W$ in the pixel 12 becomes about 60 to 80 percent.

As illustrated in FIGS. 4A and 4B, the display section 10 includes a rear panel 20, a front panel 50, and a liquid-crystal material layer 40 sandwiched between both of the panels.

The front panel 50 includes, for example, a substrate 51 made of glass, a transparent common electrode 54 (for example, made of ITO) disposed on an inner face of the substrate 51, and a polarizing film 61 disposed on an outer face of the substrate 51. This is the same in the other embodiments described later.

On a liquid-crystal material layer 40 side of the substrate 51, a black matrix 52 disposed correspondingly among subpixels adjacent to one another, a color filter disposed in an area surrounded by the black matrix 52, a transparent common electrode 54 covering a whole area including the black matrix 52 and the color filter, and an upper alignment film 55 covering a whole area including the transparent common electrode 54 are disposed. Reference numeral $53_R$ in FIG. 4A is a red color filter, and reference numeral $53_W$ in FIG. 4B is a white color filter (to put it in another way, a simple transparent filter).

The rear panel 20 includes, for example, a substrate 21 made of glass, a switching element including a TFT formed on the inner face of the substrate 21, and a pixel electrode (for example, made of ITO) which is controlled to be conductive or nonconductive by the switching element.

More specifically, a first insulating film 23 and a second insulating film 25 are formed by being laminated on the liquid-crystal material layer 40 side of the substrate 21. A semiconductor thin film 24 forming a TFT is formed between the first insulating film 23 and the second insulating film 25. A signal line 26 is formed on the second insulating film 25. A tongue of the signal line 26 is connected to one of source/drain electrodes of the TFT. A pixel electrode is connected to the other of the source/drain electrodes through a conductive section 26A. Specifically, a pixel electrode 30 is connected to the other of the source/drain electrodes in FIG. 4A. A pixel electrode 30' is connected to the other of the source/drain electrodes in FIG. 4B. In this regard, the conductive section 26A is formed, for example, by patterning at the same time of formation of the signal line 26.

The TFT functions as a switching element operating in accordance with a signal from the scanning line 22. On the basis of a TFT operation in accordance with a scanning signal from the scanning line 22, a voltage in accordance with a video signal is applied to the pixel electrodes 30 and 30' through the signal line 26 from the signal output circuit 102.

A first interlayer insulating layer 27 is formed on the second insulating film 25. Irregularities are formed on a surface of a part of the first interlayer insulating layer 27 corresponding to a subpixel. And, for example, a light reflecting plate 28 made by aluminum evaporation is formed on the irregularities. A second interlayer insulating layer 29 is formed on the light reflecting plate 28, and the pixel electrodes 30 and 30' are formed on the second interlayer insulating layer 29. And a lower alignment film 31 covering a whole area including the pixel electrodes 30 and 30' is disposed.

As illustrated in FIG. 3, the pixel electrodes 30 and 30' are formed to be rectangular in shape. As illustrated in FIG. 3, FIG. 4A and FIG. 4B, and the pixel electrodes 30 and 30' are connected to the conductive sections 26A through a contact penetrating the insulating layers 29 and 27, respectively.

The liquid-crystal material layer 40 is in contact with the lower alignment film 31 and the upper alignment film 55. The alignment films 31 and 55 specifies orientation of molecular axes of the liquid crystal molecules in a state in which electric field is not impressed. And the alignment state of the liquid crystal molecules included in the liquid-crystal material layer 40 is controlled by the electric field formed between the pixel electrodes 30 and 30' and the transparent common electrode 54.

Thickness of the liquid-crystal material layer 40 denoted by reference numeral $d_1$ in FIGS. 4A and 4B is kept to have a predetermined value by a spacer, etc., which is not illustrated in the figure. The liquid-crystal material layer 40 is controlled to have an intensity of a quarter-wave plate in accordance with an applied voltage.

For example, it is assumed that a polarizing axis of the polarizing film 61 has an angle of 135 degrees with respect to the X-axis. Outside light passes through the polarizing film 61, and becomes linearly polarized light having an angle of 135 degrees with respect to the X-axis to enter into the liquid-crystal material layer 40.

When the liquid-crystal material layer 40 functions as a quarter-wave plate, outside light passes through the liquid-crystal material layer 40 to become clockwise circularly polarized light. Next, the light is reflected by the light reflecting plate 28, and becomes counterclockwise circularly polarized light. Further, the light passes through the liquid-crystal material layer 40 to become linearly polarized light having an angle of 45 degrees, and enters into the polarizing film 61. The polarizing direction of the light incident on the polarizing film 61 is perpendicular to the polarizing axis of the polarizing film 61, and thus the light is not emitted to an observer's side. Thereby, the luminance of the pixel 12 becomes a low state.

On the other hand, when the liquid-crystal material layer 40 functions simply as a transparent layer, outside light passes the liquid-crystal material layer 40, and then is reflected by the light reflecting plate 28. Further, the light passes through the liquid-crystal material layer 40, and enters into the polarizing film 61 as linearly polarized light having an angle of 135 degrees without change. The polarizing direction of the light incident on the polarizing film 61 matches the polarizing axis of the polarizing film 61, and thus the light is emitted to the observer's side. Thereby, the luminance of the pixel 12 becomes a high state.

The liquid-crystal material layer 40 is controlled to have an intensity of a function of the quarter-wave plate in accordance with the applied voltage. A voltage in accordance with the video signal is applied to the pixel electrodes 30 and 30' through the signal line 26 from the signal output circuit 102, thus a reflection factor of the outside light is controlled, and thereby an image is displayed.

Next, a description will be given of color gamut and luminance of an image displayed on the display apparatus 1.

Figure 5B:
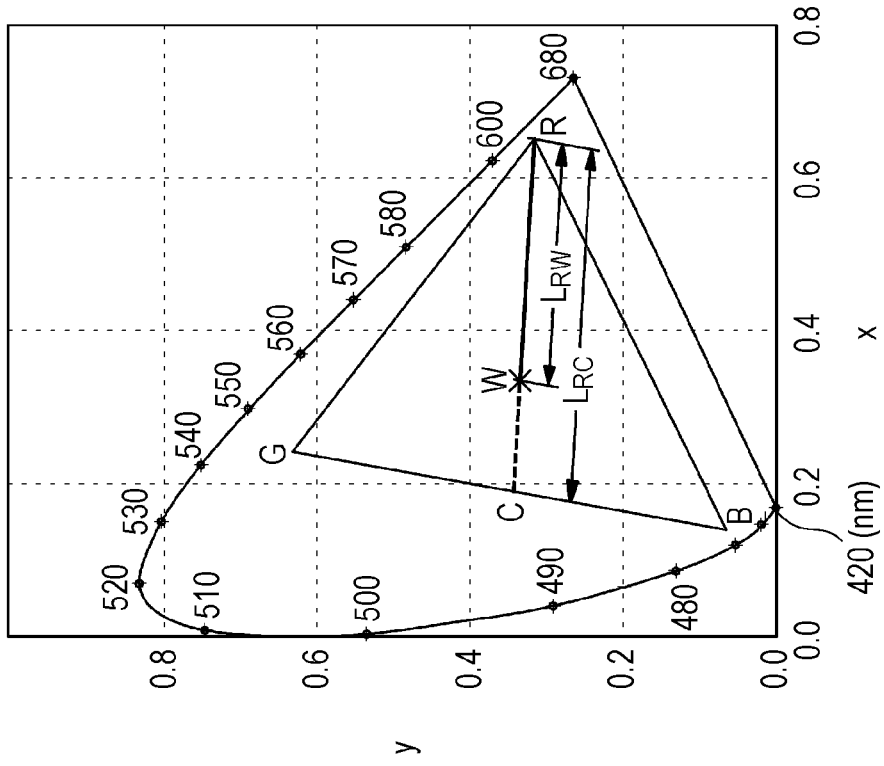
FIG. 5B is a schematic xy-chromaticity diagram for explaining a color gamut in the case of using subpixels displaying red, and subpixels displaying white or cyan.
Figure 5A:
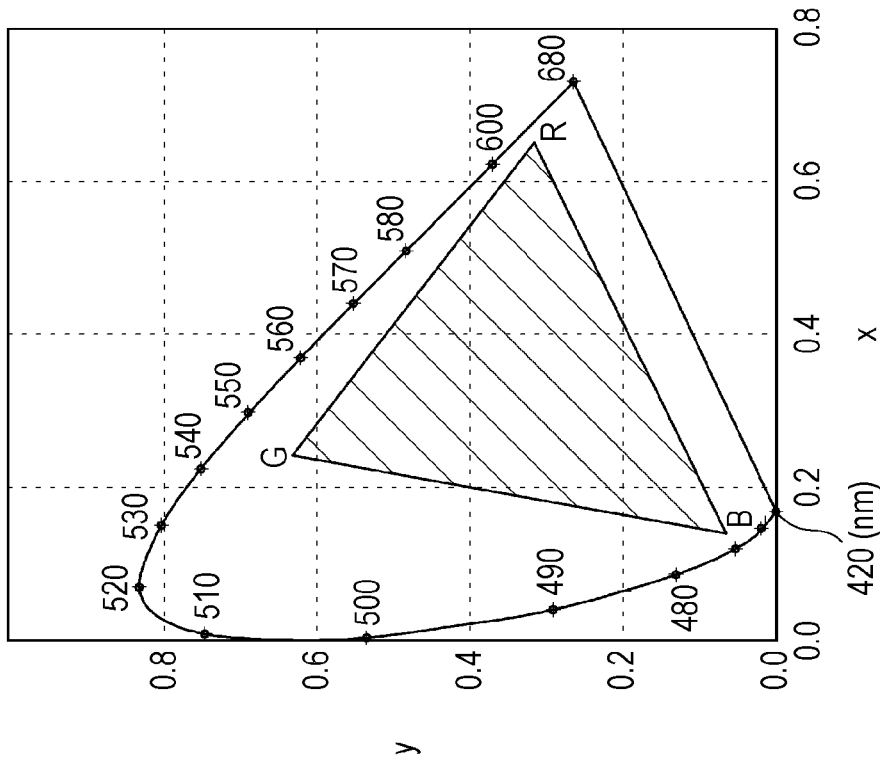
FIG. 5A is a schematic xy-chromaticity diagram for explaining a color gamut in the case of using subpixels displaying red, green, and blue.

FIG. 5A is a schematic xy-chromaticity diagram for explaining a color gamut in the case of using subpixels displaying red, green, and blue. FIG. 5B is a schematic xy-chromaticity diagram for explaining a color gamut in the case of using subpixels displaying red, and subpixels displaying white or cyan.

When subpixels displaying red, green and blue are used, it is possible to display colors in an area of a triangle having vertices denoted by reference numerals R, G, and B illustrated in FIG. 5A from additive mixture of colors. On the other hand, when subpixels displaying red and subpixels displaying white are used, it is possible to display colors in a line segment connecting points denoted by reference numerals W and R in FIG. 5B from additive mixture of colors. In this regard, in the case of a configuration in which the color filter $53_W$ illustrated in FIG. 4B is replaced by a color filter for displaying cyan, it is possible to display colors in a line segment connecting points denoted by reference numerals C and R illustrated in FIG. 5B from additive mixture of colors. In this regard, as for colors recognized by additive mixture of two colors, a description has been given, for example in, Takayanagi Kenjiro, "Method of reproducing color by two-color method", Television, Nikkan Kogyo Shinbunsha, Mar. 1, 1960, Vol. 14, No. 3, 111-116, 137.

When subpixels displaying red, green and blue are used, only light in a specific wavelength range is used among outside light incident on the subpixels, and thus light use efficiency is low. In contrast, in the display apparatus 1, a large portion of the pixel 12 is occupied by the subpixel 12W, and further, the subpixel 12W uses outside light without change for displaying. Accordingly, light use efficiency is high, and thus it is possible to display an image having higher luminance. Although light use efficiency is lowered a little, this is the same for the configuration in which the color filter $53_W$ is replaced by the color filter for displaying cyan.

And as described above, in the display apparatus 1, it is possible to display colors in a line segment connecting points denoted by reference numerals W and R in FIG. 5B from additive mixture of colors. Also, in the configuration in which the color filter $53_W$ is replaced by the color filter for displaying cyan, it is possible to display colors in a line segment connecting points denoted by reference numerals C and R illustrated in FIG. 5B. Accordingly, it is possible to ensure a certain range of color gamut.

Second Embodiment

A description will be given of a display apparatus according to a second embodiment of the present disclosure.

Figure 6:
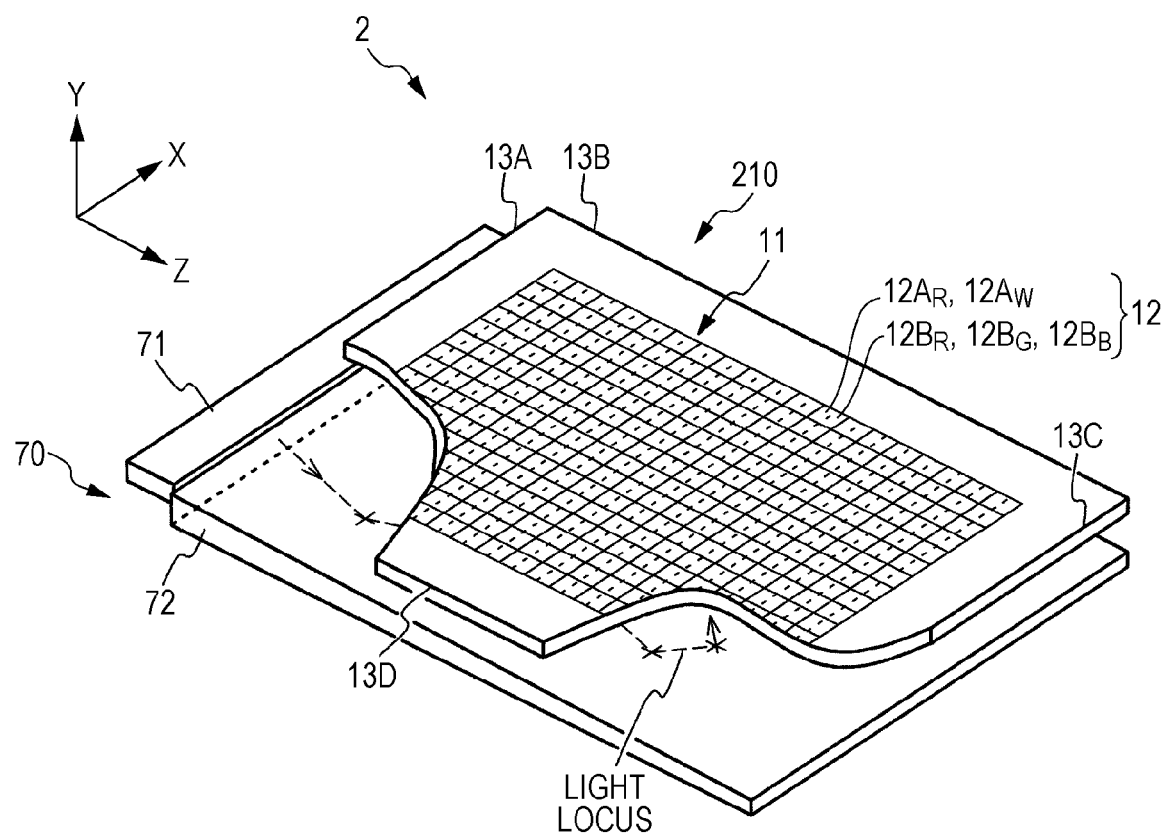
FIG. 6 is a schematic perspective view of a display apparatus according to a second embodiment.

FIG. 6 is a schematic perspective view of a display apparatus according to the second embodiment.

A display apparatus 2 includes a transflective display section 210 including an array of pixels 12 in a two-dimensional matrix. The pixel 12 includes a pair of one of a transmissive subpixel $12B_R$ for displaying red color, a transmissive subpixel $12B_G$ for displaying green color and a transmissive subpixel $12B_B$ for displaying blue color, and one of a reflective subpixel $12A_R$ for displaying red color and a reflective subpixel $12A_W$ for displaying white color.

The display apparatus 2 includes an illumination section 70 emitting light from a back face of the display section 10. The illumination section 70 includes a light guiding plate 72 which is disposed opposed to the back face of the display section 210, and a light source 71 which is disposed opposed to an end face of the light guiding plate 72, and, for example, includes a cold cathode fluorescent lamp. The light guiding plate 72 is substantially rectangular in shape.

Normally, intensity of light reaching the display section 10 has a tendency to become weaker as a distance from the light source 71 becomes larger. In order to cancel this tendency, the light guiding plate 72 is wedge-shaped. The light source 71 is disposed opposed to an end face of a side 13A of the light guiding plate 72. Thickness of the light guiding plate 72 becomes gradually smaller from the side 13A toward the side 13C. An incident angle of light that entered into the light guiding plate 72 toward a face of the display section 210 becomes smaller each time the light is totally reflected in the light guiding plate 72. Accordingly, the longer the distance from the light source 71, the smaller becomes an incident angle of the light that travels in the light guiding plate 72 toward the face of the display section 210, and thus the light becomes easier to go through the display section 210. Thereby, the above-described tendency is canceled, and thus it is possible to illuminate the display section 210 with a certain intensity regardless of the distance from the light source 71.

The display section 210 includes a transflective liquid-crystal display panel. For convenience of explanation, it is assumed that a display area 11 of the display section 210 is parallel to an X-Z plane, and an observer's side of an image is in +Y direction. A scanning circuit 101 and a signal output circuit 202, which will be illustrated in FIG. 7 later, are omitted to be illustrated in FIG. 6. These are the same in the other embodiments described later.

A description will be given of details of the subpixels according to the second embodiment.

Figure 7:
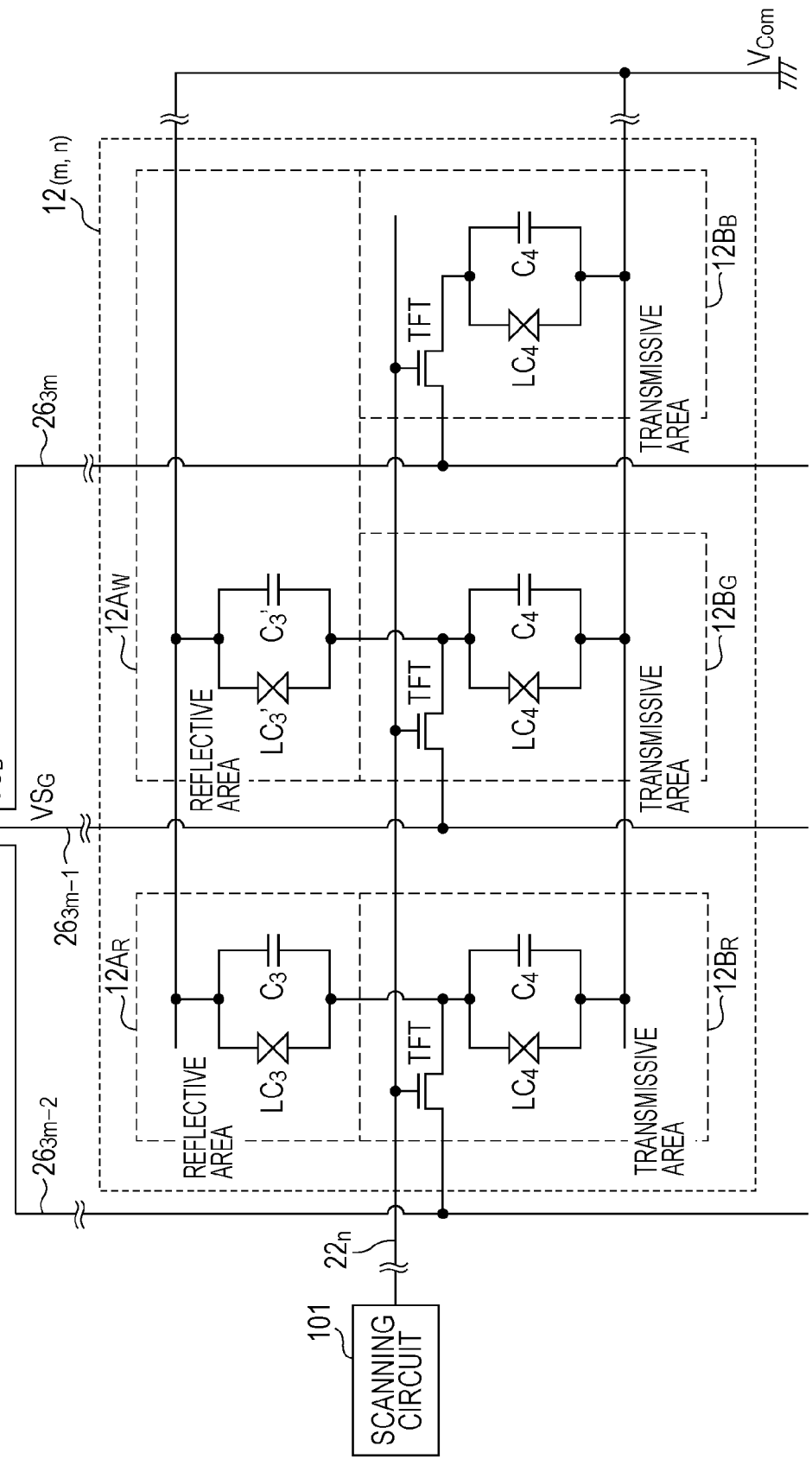
FIG. 7 is a schematic circuit diagram of a display section of a portion including a (m, n)-th pixel.

FIG. 7 is a schematic circuit diagram of a display section of a portion including a (m, n)-th pixel.

The display apparatus 2 is a display apparatus that includes N pieces of scanning lines 22, which extend in a row direction and individual one ends of which are connected to the scanning circuit 101, 3×M pieces of signal lines 26, which extend in a column direction and individual one ends of which are connected to the signal output circuit 202, and subpixels, which are connected to the individual scanning lines 22 and the individual signal lines 26 and include a transistor (TFT) operating in response to a scanning signal from the individual scanning lines 22. This is the same for the other embodiments described later.

An n-th row scanning line $22_n$ is connected to a pixel $12_{(m, n)}$. A (3×m−2)-th column signal line $26_{3m-2}$ is connected to a subpixel $12A_R$ and a subpixel $12B_R$, a (3×m−1)-th column signal line $26_{3m-1}$ is connected to a subpixel $12A_W$ and a subpixel $12B_G$, and a (3×m)-th column signal line $26_{3m}$ is connected to a subpixel $12B_B$.

Liquid crystal capacitors $LC_3$, $LC_3'$ and $LC_4$, illustrated in FIG. 7, include a transparent common electrode disposed on the front panel, a pixel electrode disposed on the rear panel, and a liquid-crystal material layer sandwiched between the front panel and the rear panel. Also, retention capacitors $C_3$, $C_3'$ and $C_4$ are formed by auxiliary electrodes conducted to the pixel electrodes, etc. In this regard, in the following FIG. 8 to FIG. 11, the auxiliary electrodes are omitted to be illustrated.

Signals in accordance with a color image to be displayed are supplied to the display apparatus 2 from the outside. A video signal $VS_R$ for displaying red color, a video signal $VS_G$ for displaying green color and a video signal $VS_B$ for displaying blue color are generated by a circuit, not illustrated in the figure, on the basis of the signal according to the color image. And the signal output circuit 202 drives a transmissive subpixel $12B_R$ for displaying red color and a reflective subpixel $12A_R$ for displaying red color using the video signal $VS_R$ for displaying red color. The signal output circuit 202 drives the transmissive subpixel $12B_G$ for displaying green color and the reflective subpixel $12A_W$ for displaying white color using the video signal $VS_G$ for displaying green color. And the signal output circuit 202 drives a transmissive subpixel $12B_B$ for displaying blue color using a video signal $VS_B$ for displaying blue color.

Figure 8:
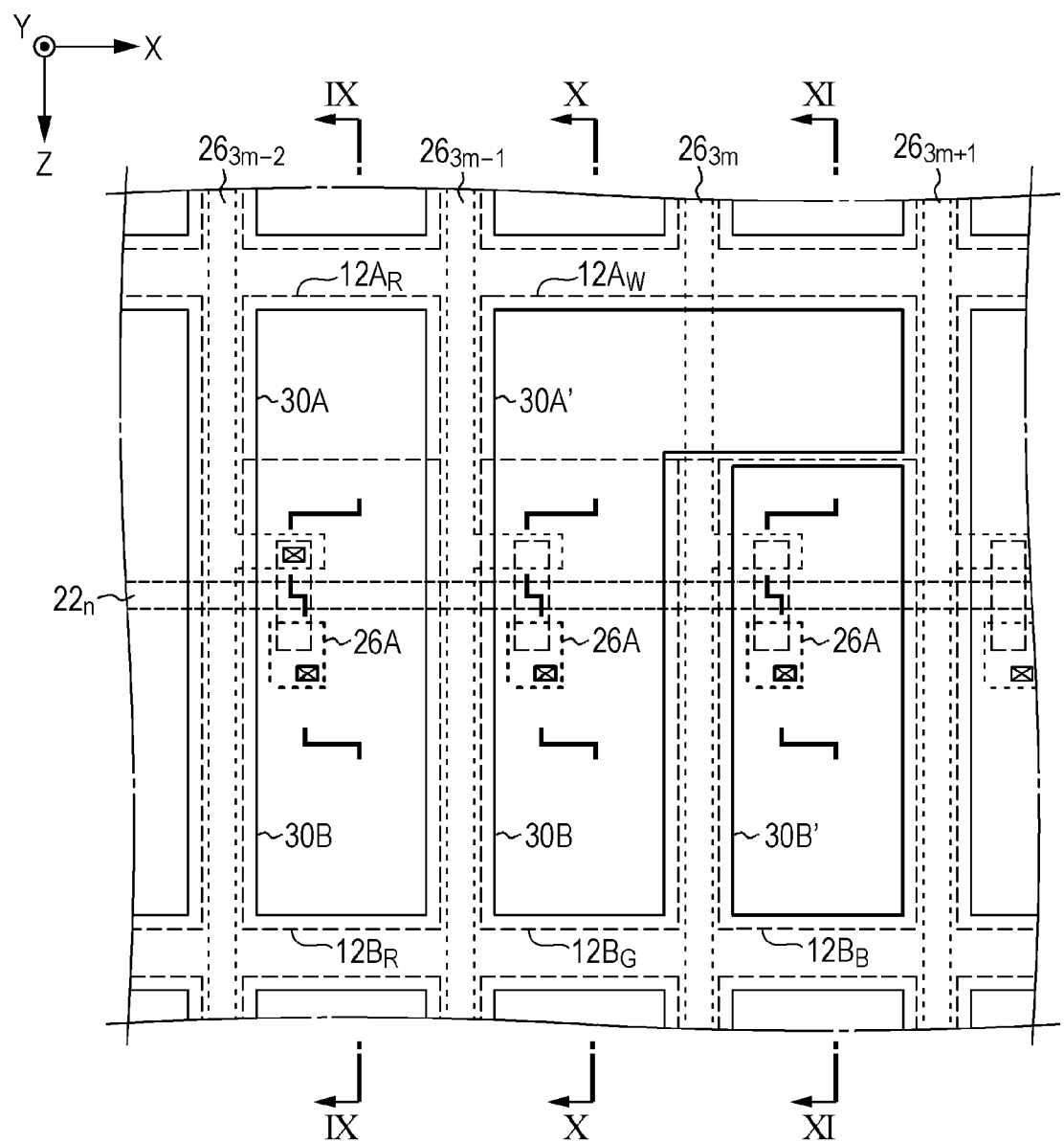
FIG. 8 is a schematic plan view for explaining arrangement of various components in the display section of the portion including the (m, n)-th pixel.
Figure 9:
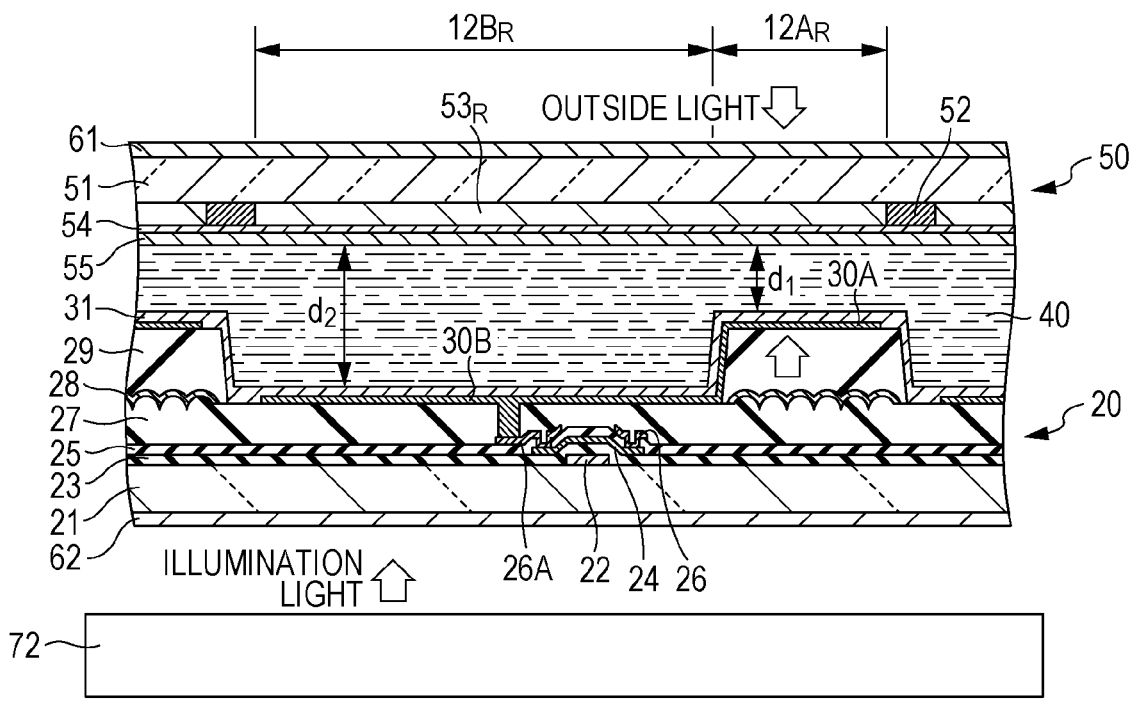
FIG. 9 is a schematic sectional view of the display section taken on line IX-IX of FIG. 8.
Figure 11:
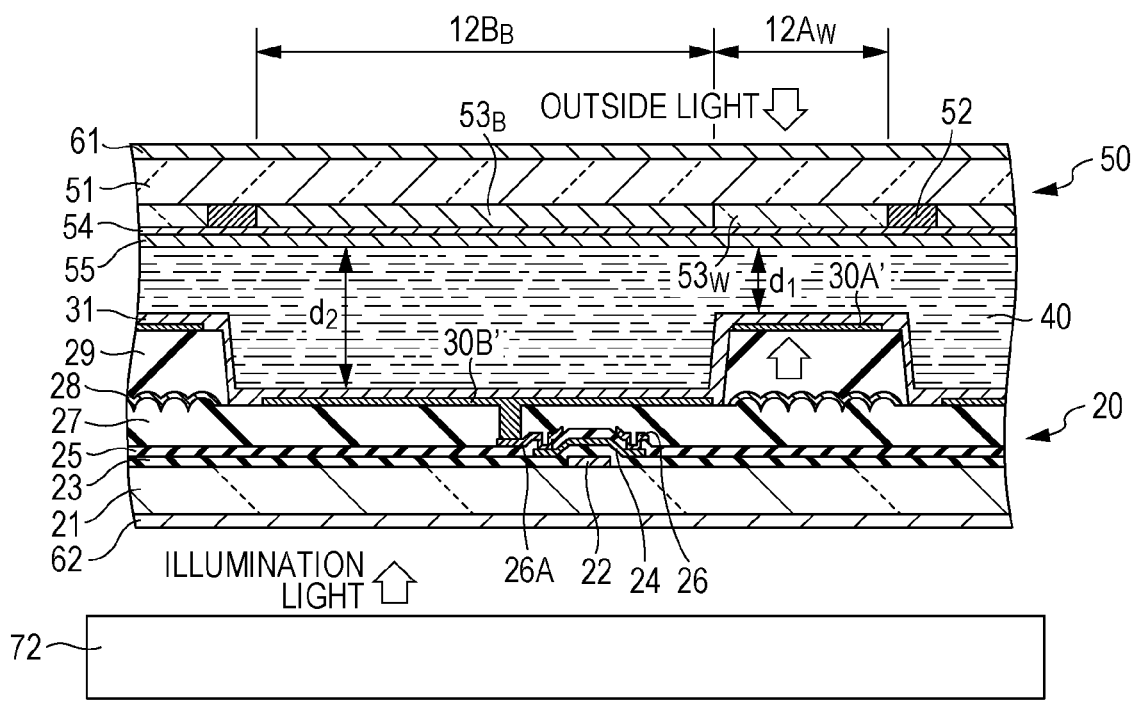
FIG. 11 is a schematic sectional view of the display section taken on line XI-XI of FIG. 8.

FIG. 8 is a schematic plan view for explaining arrangement of various components in the display section of the portion including the (m, n)-th pixel. FIG. 9 is a schematic sectional view of the display section taken on line IX-IX of FIG. 8. FIG. 10 is a schematic sectional view of the display section taken on line X-X of FIG. 8. FIG. 11 is a schematic sectional view of the display section taken on line XI-XI of FIG. 8.

As illustrated in FIG. 8, etc., a larger portion of a pixel 12 is occupied by a transmissive subpixel in the display apparatus 2 (transmissiveness is emphasized in design). The display apparatus 2 has a configuration in which transmissive display is normally performed by additive mixture of the three primary colors, and reflective display is performed with higher luminance while ensuring a certain degree of color gamut.

The configuration of a black matrix 52, illustrated in FIG. 9 to FIG. 11, is the same as the configuration described in the first embodiment. A color filter is disposed in an area surrounded by the black matrix 52. And a transparent common electrode 54 covering a whole area including the black matrix 52 and the color filter, and an upper alignment film 55 covering a whole area including the transparent common electrode 54 are disposed. Reference numeral $53_R$ illustrated in FIG. 9 denotes a red filter, reference numeral $53_G$ illustrated in FIG. 10 denotes a green filter, and reference numeral $53_B$ illustrated in FIG. 11 denotes a blue filter. Also, reference numeral $53_W$ illustrated in FIG. 10 and FIG. 11 denotes a white filter.

The rear panel 20 includes, for example, a substrate 21 made of glass, a switching element including a TFT formed on the inner face of the substrate 21, and a pixel electrode (for example, made of ITO) which is controlled to be conductive or nonconductive by the switching element.

In this regard, a display apparatus according to the second embodiment includes a polarizing film 62 disposed on an outer face of the substrate 21 unlike the first embodiment. Also, in the display apparatus according to the second embodiment, the second interlayer insulating layer 29 and the light reflecting plate 28 on a portion corresponding to the transmissive subpixel are removed.

A polarizing axis of the polarizing film 62 has an angle of 135 degrees with respect to the X-axis. And, thickness denoted by reference numeral $d_2$ in FIG. 9 to FIG. 11 is set to be twice the thickness denoted by reference numeral $d_1$. The liquid-crystal material layer 40 of a potion corresponding to the reflective subpixel is controlled to have a function of a quarter-wave plate in accordance with an applied voltage. Also, the liquid-crystal material layer 40 of a portion corresponding to the transmissive subpixel is controlled to have a function of a half-wave plate in accordance with an applied voltage.

Operation of the reflective subpixel is the same as that described in the first embodiment. A description will be given of operation on the transmissive subpixel.

Illumination light from the light guiding plate 72 passes through the polarizing film 62 to become linearly polarized light having an angle of 135 degrees with reference to the X-axis, and enters into the liquid-crystal material layer 40. When the liquid-crystal material layer 40 of the portion corresponding to the transmissive subpixel functions as a half-wave plate, the illumination light from the light guiding plate 72 passes through the liquid-crystal material layer 40 to become linearly polarized light having an angle of 45 degrees, and enters into the polarizing film 61. The polarizing direction of the light incident on the polarizing film 61 is perpendicular to the polarizing axis of the polarizing film 61, and thus the light is not emitted to an observer's side. Thereby, the luminance of the pixel 12 becomes a low state.

On the other hand, when the liquid-crystal material layer 40 of the portion corresponding to the transmissive subpixel functions simply as a transparent layer, the illumination light from the light guiding plate 72 enters into the polarizing film 61 as linearly polarized light having an angle of 135 degrees without change. The polarizing direction of the light incident on the polarizing film 61 matches the polarizing axis of the polarizing film 61, and thus the light is emitted to the observer's side. Thereby, the luminance of the pixel 12 becomes a high state.

The liquid-crystal material layer 40 of the portion corresponding to the transmissive subpixel is controlled to have an intensity of a function of a half-wave plate in accordance with the applied voltage. A voltage in accordance with the video signal is applied to the pixel electrodes through the signal line 26 from the signal output circuit 202, thus a transmission factor of the luminance light is controlled, and thereby an image is displayed.

The TFT functions as a switching element operating in accordance with a signal from the scanning line 22. As illustrated in FIG. 9, the pixel electrode 30B of the subpixel $12B_R$ and the pixel electrode 30A of the subpixel $12A_R$ are integrally formed. On the basis of a TFT operation in accordance with a scanning signal from the scanning line 22, a voltage in accordance with a video signal $VS_R$ is applied to these pixel electrodes through the signal line 26 from the signal output circuit 202.

Also, as illustrated in FIG. 10, a pixel electrode 30B of the subpixel $12B_G$ and a pixel electrode 30A' of the subpixel $12A_W$ are integrally formed. On the basis of a TFT operation in accordance with a scanning signal from the scanning line 22, a voltage in accordance with a video signal $VS_G$ is applied to these pixel electrodes through the signal line 26 from the signal output circuit 202.

On the other hand, as illustrated in FIG. 11, a pixel electrode 30B' of the subpixel $12B_G$ is formed independently of the pixel electrode 30A' of the subpixel $12A_W$. On the basis of a TFT operation in accordance with a scanning signal from the scanning line 22, a voltage in accordance with a video signal $VS_B$ is applied to the pixel electrode 30B' through the signal line 26 from the signal output circuit 202.

And as illustrated in FIG. 8, the pixel electrode 30A' illustrated in FIG. 11 and the pixel electrode 30A' illustrated in FIG. 10 are integrally formed. Accordingly, as described with reference to FIG. 10, a voltage in accordance with the video signal $VS_G$ is applied to the pixel electrode 30A' illustrated in FIG. 11.

Next, a description will be given of color gamut and luminance of an image displayed on the display apparatus 2.

For an image based on the transmissive subpixels $12B_R$, $12B_G$ and $12B_B$, it is possible to display colors in an area of a triangle having vertices denoted by reference numerals R, G, and B illustrated in FIG. 5A from additive mixture of colors. On the other hand, for an image based on the reflective subpixel $12A_R$ and $12A_W$, it is possible to display colors in a line segment connecting points denoted by reference numerals W and R in FIG. 5B from additive mixture of colors. In this regard, in the case of a configuration in which the color filter $53_W$ illustrated in FIGS. 10 and 11 is replaced by a color filter for displaying cyan, it is possible to display colors in a line segment connecting points denoted by reference numerals C and R illustrated in FIG. 5B from additive mixture of colors.

Accordingly, it is possible for the display apparatus 2 to display a favorable image by additive mixture of the three primary colors at the time of operating as a transmissive type, and to display images having higher luminance while ensuring a certain degree of color gamut at the time of operating as a reflective type.

Third Embodiment

A description will be given of a display apparatus according to a third embodiment of the present disclosure. In the third embodiment, the configuration of the reflective subpixels for displaying white color is different from the second embodiment.

In a schematic perspective view of a display apparatus according to the third embodiment, the subpixels $12A_W$ illustrated in FIG. 6 ought to be changed for subpixels $12A_{W1}$ and $12A_{W2}$, the display section 210 ought to be changed for a display section 310, and the display apparatus 2 ought to be changed for a display apparatus 3.

In the display section 310, a pixel 12 includes a first reflective subpixel and a second reflective subpixel for displaying white color.

A description will be given of details of the subpixels according to the third embodiment.

Figure 12:
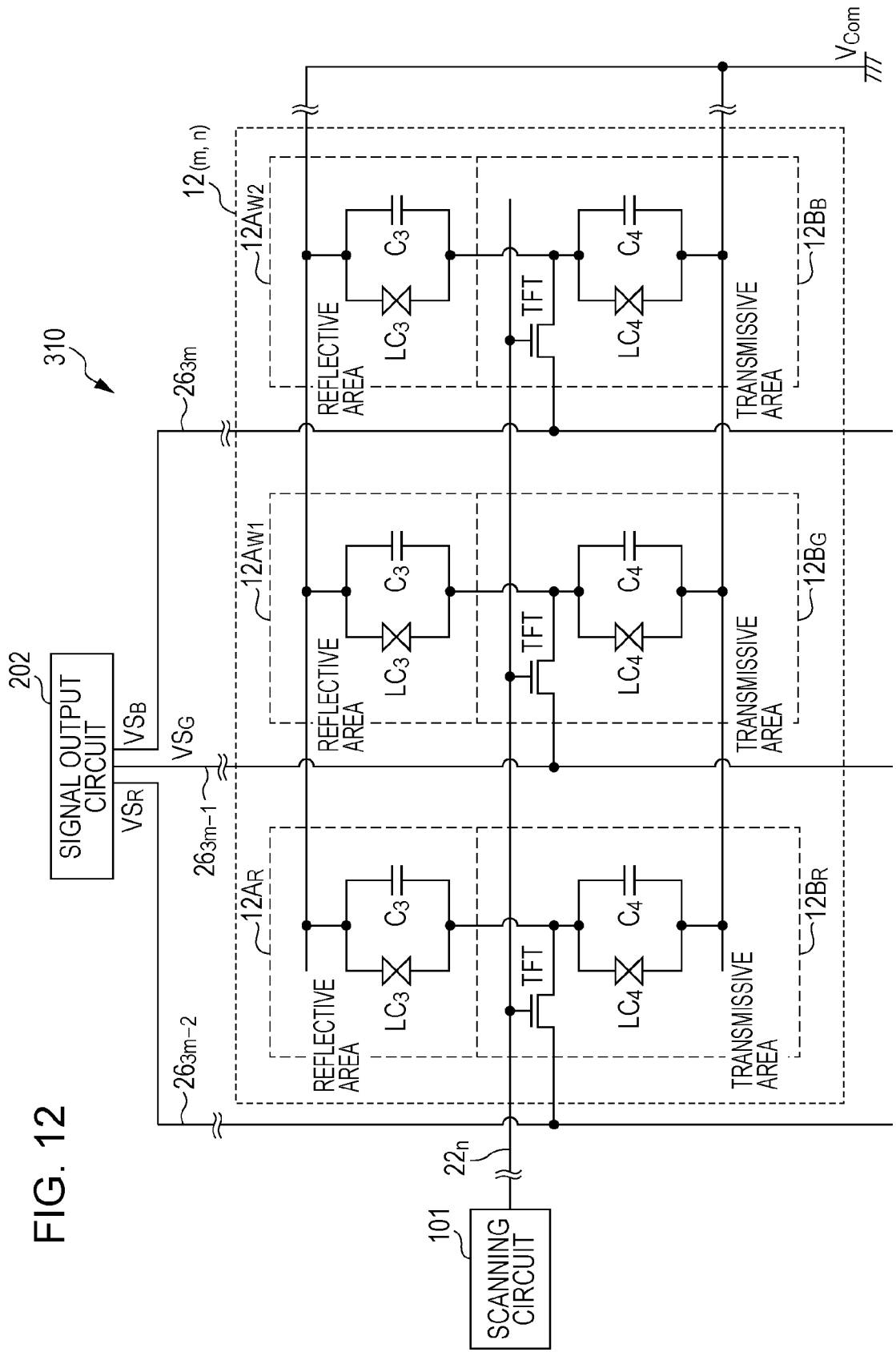
FIG. 12 is a schematic circuit diagram of a display section of a portion including a (m, n)-th pixel in a display apparatus according to a third embodiment.

FIG. 12 is a schematic circuit diagram of a display section of a portion including a (m, n)-th pixel according to the third embodiment.

A scanning line $22_n$ of an n-th row is connected to a pixel 12 (m, n). A signal line $26_{3m-2}$ of a (3×m−2)-th column is connected to a subpixel $12A_R$ and a subpixel $12B_R$. A signal line $26_{3m-1}$ of a (3×m−1)-th column is connected to a subpixel $12A_{W1}$ and a subpixel $12B_G$. A signal line $26_{3m}$ of a (3×m)-th column is connected to a subpixel $12A_{W2}$ and a subpixel $12B_B$.

The description has been given of the liquid crystal capacitors $LC_3$ and $LC_4$, and the retention capacitors $C_3$ and $C_4$, illustrated in FIG. 12, in the second embodiment with reference to FIG. 7, and thus the description thereof will be omitted.

Signals in accordance with a color image to be displayed are supplied to the display apparatus 3 from the outside. A video signal $VS_R$ for displaying red color, a video signal $VS_G$ for displaying green color and a video signal $VS_B$ for displaying blue color are generated by a circuit, not illustrated in the figure, on the basis of the signal according to the color image. And the signal output circuit 202 drives a transmissive subpixel $12B_R$ for displaying red color and a reflective subpixel $12A_R$ for displaying red color using the video signal $VS_R$ for displaying red color. The signal output circuit 202 drives a transmissive subpixel $12B_G$ for displaying green color and a first reflective subpixel $12A_{W1}$ for displaying white color using a video signal $VS_G$ for displaying green color. And the signal output circuit 202 drives a transmissive subpixel $12B_B$ for displaying blue color and a second reflective subpixel $12A_{W2}$ for displaying white color using a video signal $VS_B$ for displaying blue color.

Figure 13:
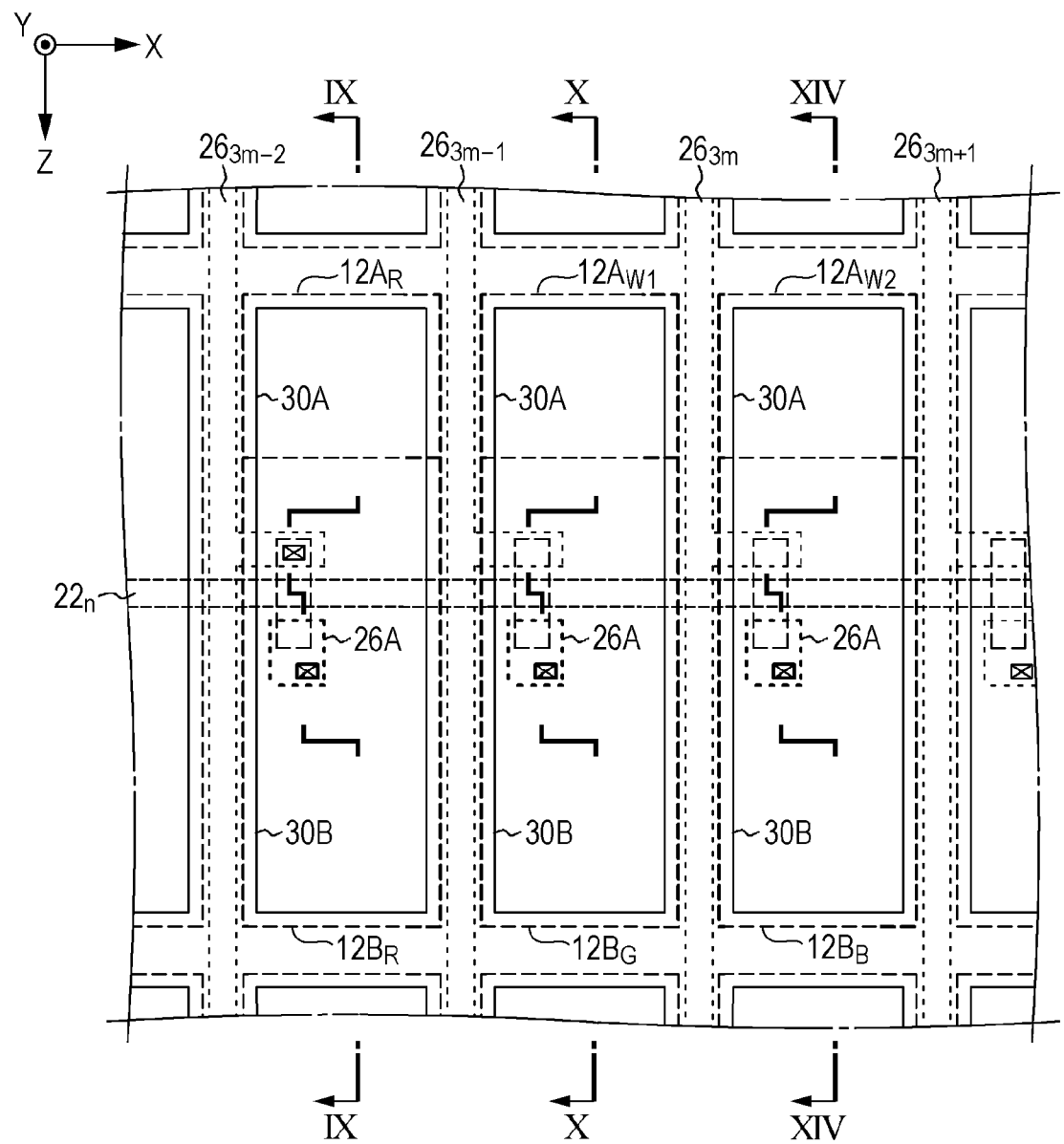
FIG. 13 is a schematic plan view for explaining arrangement of various components in the display section of the portion including the (m, n)-th pixel.

FIG. 13 is a schematic plan view for explaining arrangement of various components in the display section of the portion including the (m, n)-th pixel.

Figure 14:
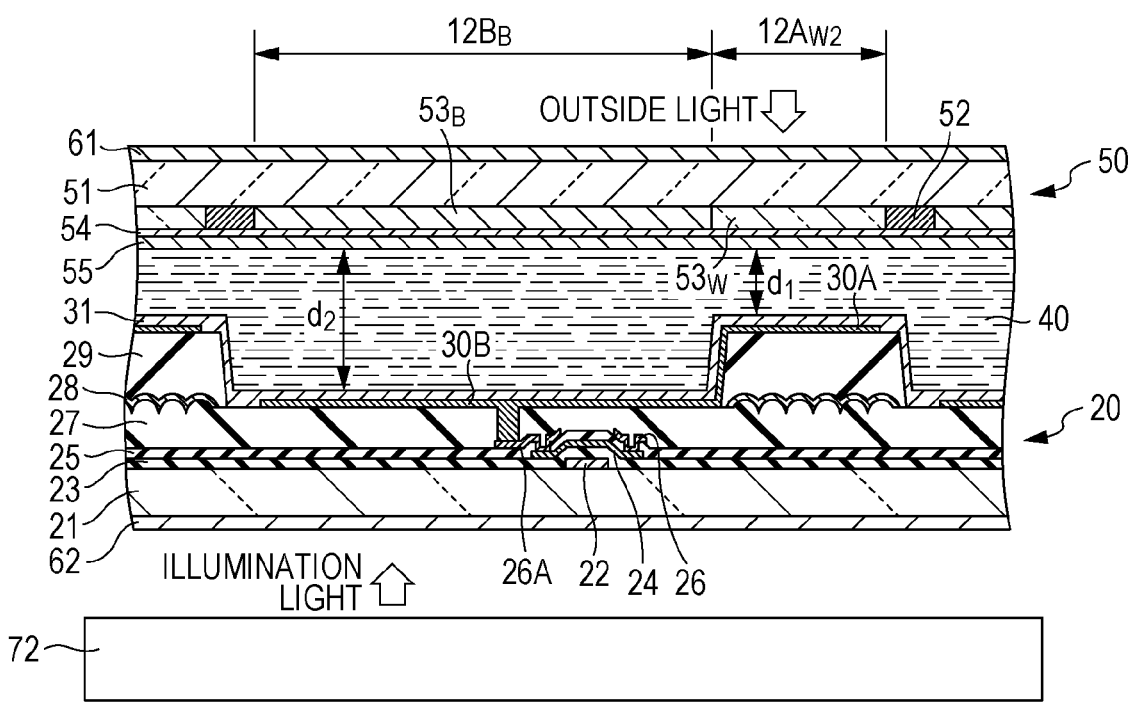
FIG. 14 is a schematic sectional view of the display section taken on line XIV-XIV of FIG. 13.

FIG. 14 is a schematic sectional view of the display section taken on line XIV-XIV of FIG. 13. In this regard, a schematic sectional view of the display section taken on line IX-IX of FIG. 13 is the same as that in FIG. 9. Also, a schematic sectional view of the display section taken on line X-X of FIG. 13 ought to be obtained by changing reference numeral $12A_W$ for reference numeral $12A_{W1}$ in FIG. 10.

Operation of the display apparatus 3 is the same as described in the second embodiment except that a reflective subpixel $12A_{W2}$ for white color is driven by the video signal $VS_B$ for displaying blue color.

As illustrated in FIG. 8, in the display section 210 according to the second embodiment, it is necessary that the individual pixel electrodes are different in planar shape. In contrast, in the display section 310 according to the third embodiment, it is possible for the individual pixel electrodes to have a same planar shape. Accordingly, the third embodiment has an advantage in that the display section 310 is easy to manufacture.

Fourth Embodiment

A description will be given of a display apparatus according to a fourth embodiment of the present disclosure.

Figure 15:
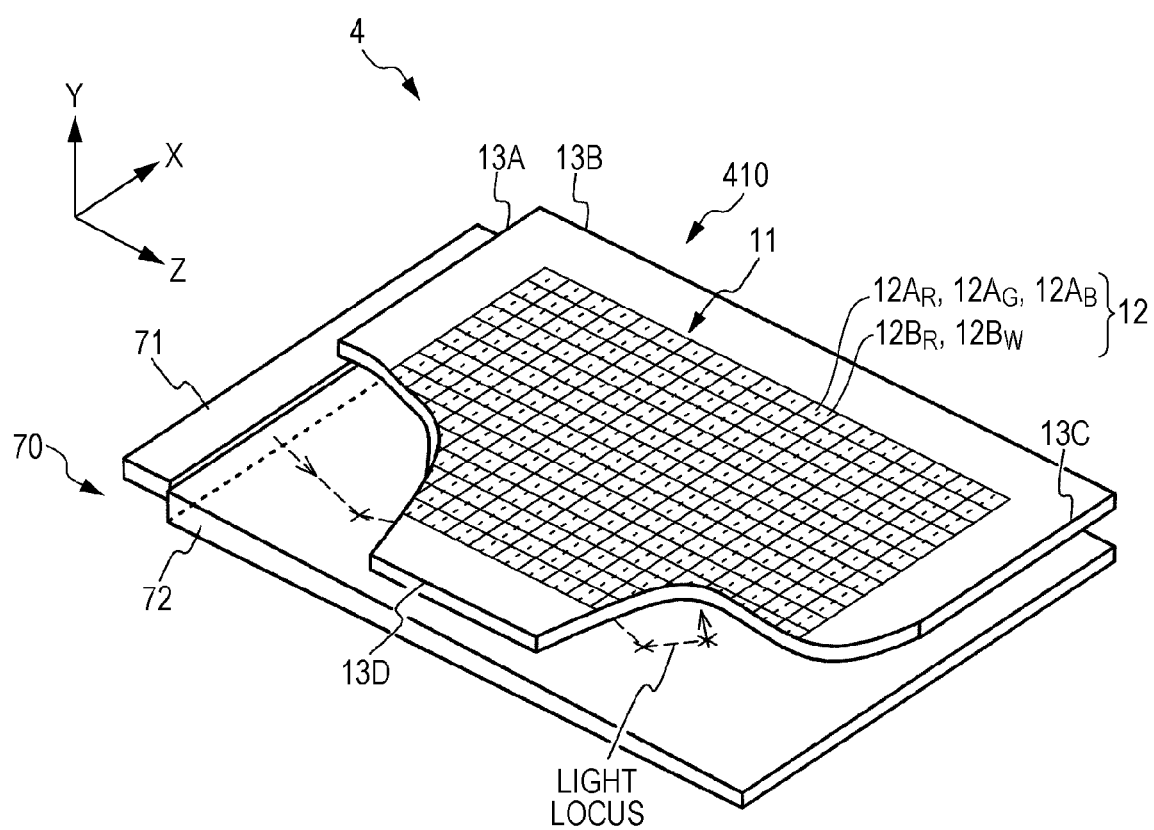
FIG. 15 is a schematic perspective view of a display apparatus according to a fourth embodiment.

FIG. 15 is a schematic perspective view of a display apparatus according to a fourth embodiment.

A display apparatus 4 includes a transflective display section 410 including an array of pixels 12 in a two-dimensional matrix. The pixel 12 includes a pair of one of a reflective subpixel $12A_R$ for displaying red color, a reflective subpixel $12A_G$ for displaying green color and a reflective subpixel $12A_B$ for displaying blue color, and one of a transmissive subpixel $12B_R$ for displaying red color and a transmissive subpixel $12B_W$ for displaying white color. The display section 410 is made of a transflective liquid-crystal display panel.

A description will be given of details of the subpixels according to the fourth embodiment.

Figure 16:
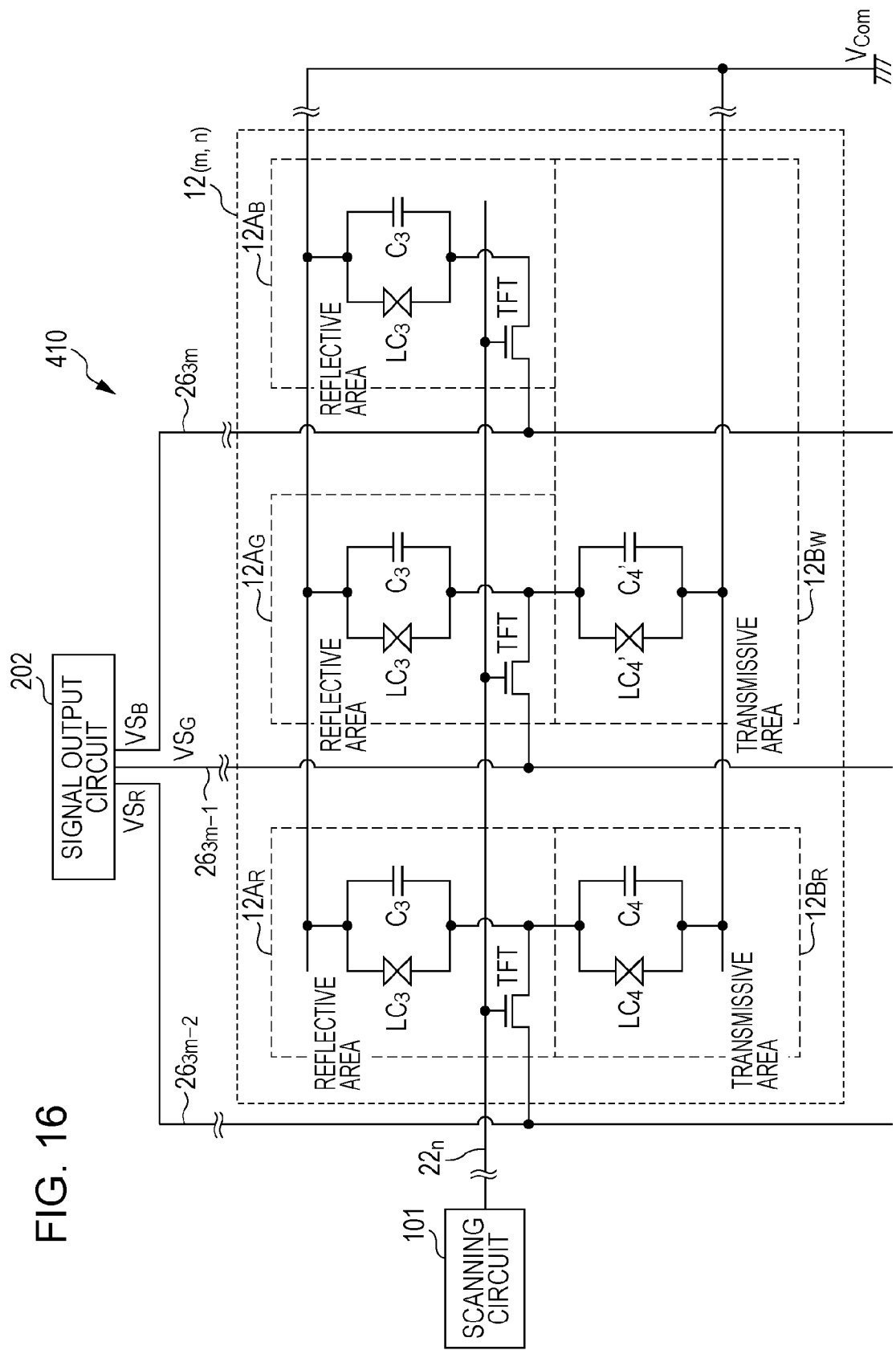
FIG. 16 is a schematic circuit diagram of a display section of a portion including a (m, n)-th pixel.

FIG. 16 is a schematic circuit diagram of a display section of a portion including a (m, n)-th pixel.

An n-th row scanning line $22_n$ is connected to a pixel $12_{(m,\ n)}$. A (3×m−2)-th column signal line $26_{3m-2}$ is connected to the subpixel $12A_R$ and the subpixel $12B_R$, a (3×m−1)-th column signal line $26_{3m-1}$ is connected to the subpixel $12A_G$ and the subpixel $12B_W$, and a (3×m)-th column signal line $26_{3m}$ is connected to the subpixel $12A_B$.

Basically, the liquid crystal capacitors $LC_3$, $LC_4$ and $LC_4'$, and the retention capacitors $C_3$, $C_4$ and $C_4'$, illustrated in FIG. 16, have the same configurations as those described in the second embodiment with reference to FIG. 7, and thus the description thereof will be omitted.

Signals in accordance with a color image to be displayed are supplied to the display apparatus 4 from the outside. A video signal $VS_R$ for displaying red color, a video signal $VS_G$ for displaying green color and a video signal $VS_B$ for displaying blue color are generated by a circuit, not illustrated in the figure, on the basis of the signal according to the color image. And the signal output circuit 202 drives a reflective subpixel $12A_R$ for displaying red color and a transmissive subpixel $12B_R$ for displaying red color using the video signal $VS_R$ for displaying red color. The signal output circuit 202 drives a reflective subpixel $12A_G$ for displaying green color and a transmissive subpixel $12B_W$ for displaying white color using a video signal $VS_G$ for displaying green color. And the signal output circuit 202 drives a reflective subpixel $12A_B$ for displaying blue color using a video signal $VS_B$ for displaying blue color.

Figure 17:
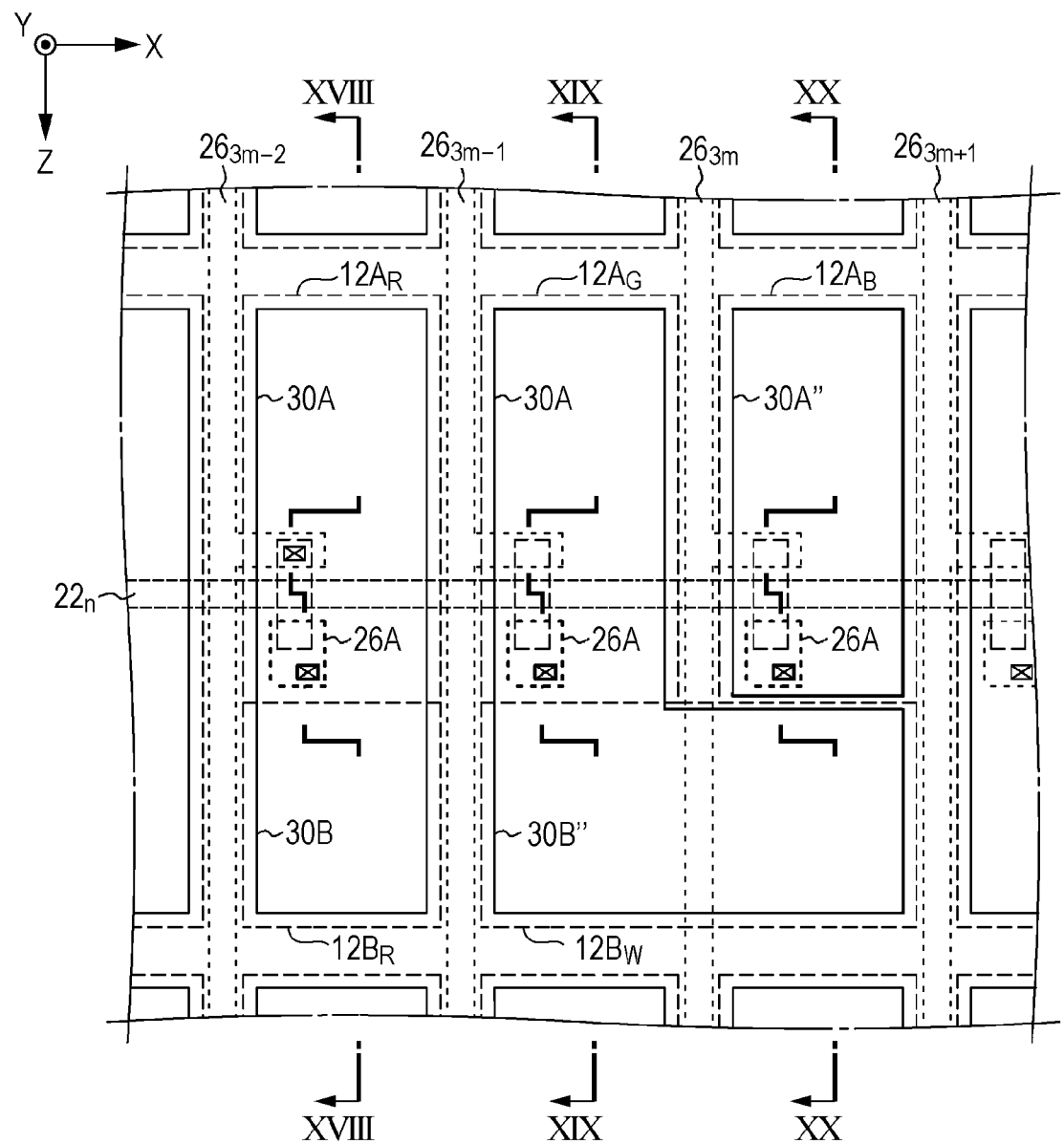
FIG. 17 is a schematic plan view for explaining arrangement of various components in the display section of the portion including the (m, n)-th pixel.
Figure 18:
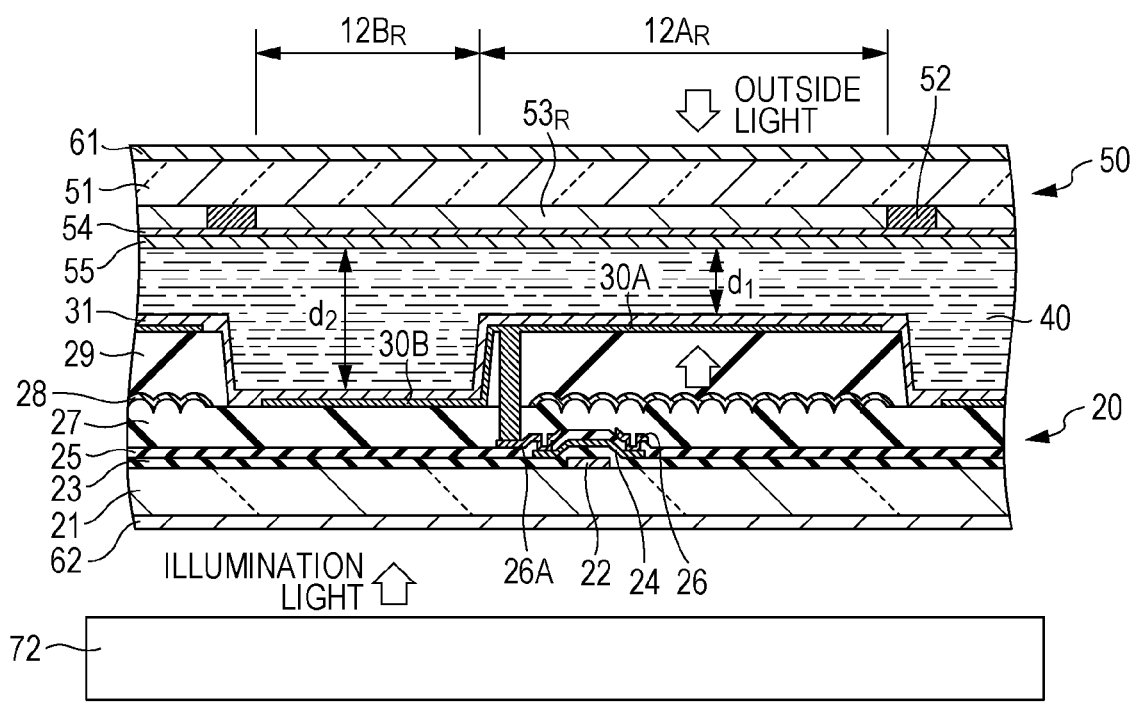
FIG. 18 is a schematic sectional view of the display section taken on line XVIII-XVIII of FIG. 17.
Figure 19:
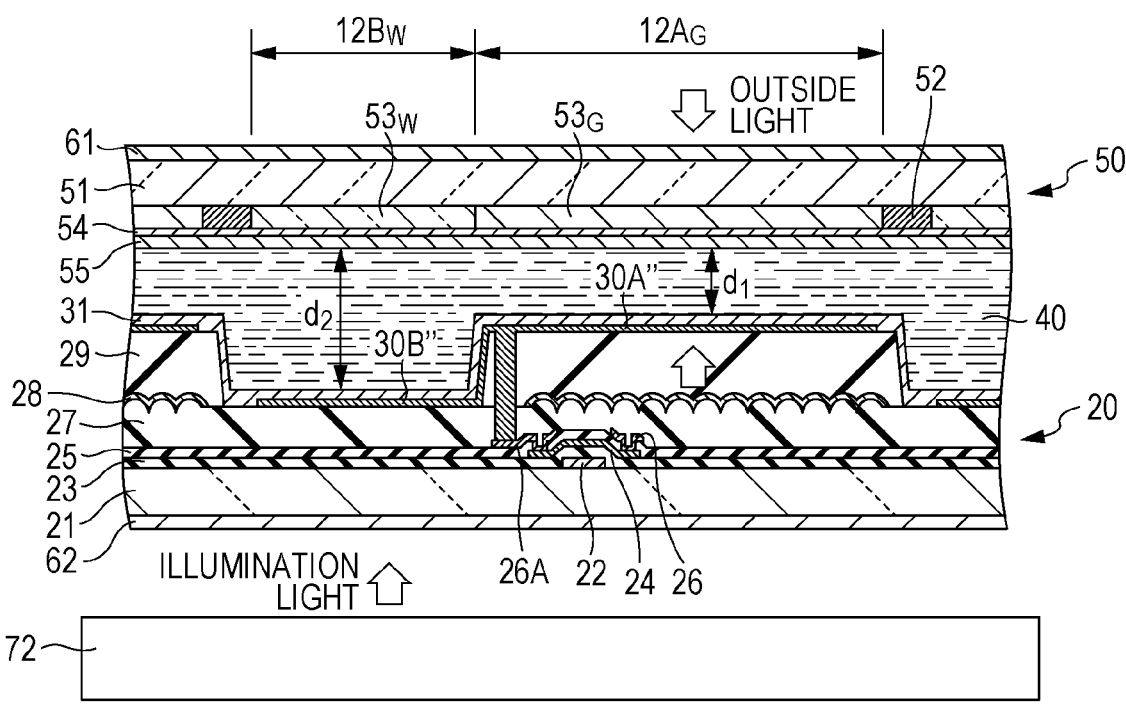
FIG. 19 is a schematic sectional view of the display section taken on line XIX-XIX of FIG. 17.
Figure 20:
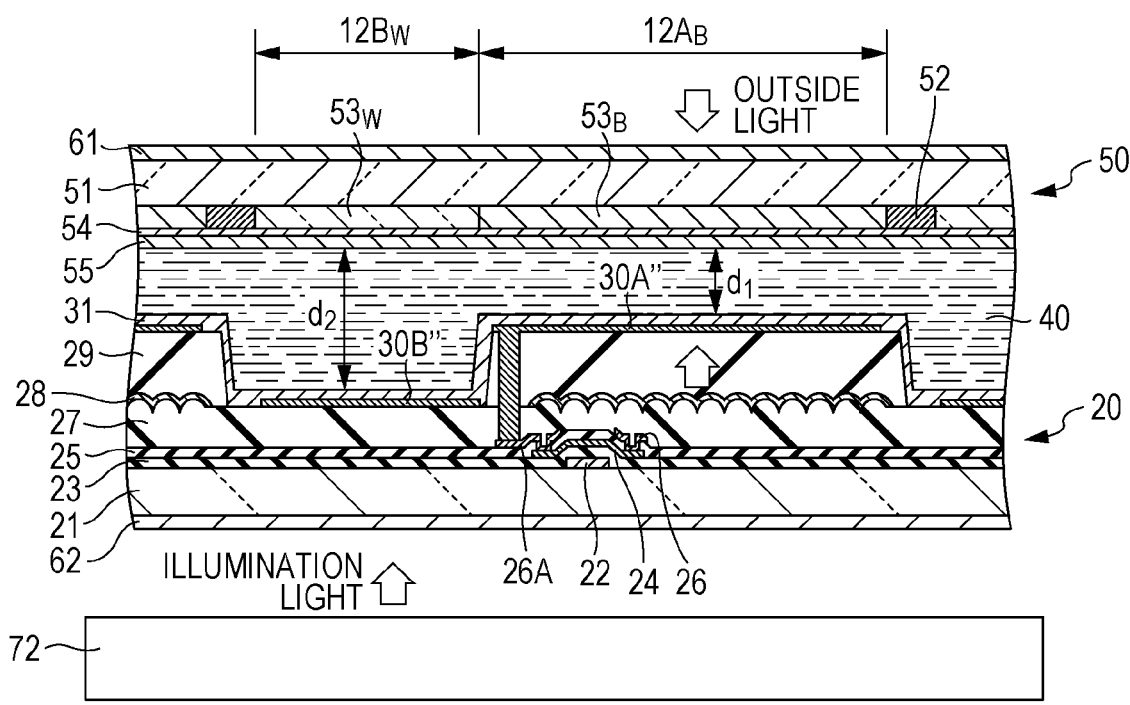
FIG. 20 is a schematic sectional view of the display section taken on line XX-XX of FIG. 17.

FIG. 17 is a schematic plan view for explaining arrangement of various components in the display section of the portion including the (m, n)-th pixel. FIG. 18 is a schematic sectional view of the display section taken on line XVIII-XVIII of FIG. 17. FIG. 19 is a schematic sectional view of the display section taken on line XIX-XIX of FIG. 17. FIG. 20 is a schematic sectional view of the display section taken on line XX-XX of FIG. 17.

As illustrated in FIG. 17, etc., a larger portion of a pixel 12 is occupied by a reflective subpixel in the display apparatus 4 (reflectiveness is emphasized in design). The display apparatus 4 has a configuration in which reflective display is normally performed by additive mixture of the three primary colors, and transmissive display is performed with higher luminance while ensuring a certain degree of color gamut.

The configuration of a black matrix 52, illustrated in FIG. 18 to FIG. 20, is the same as the configuration described in the first embodiment. A color filter is disposed in an area surrounded by the black matrix 52. And a transparent common electrode 54 covering a whole area including the black matrix 52 and the color filter, and an upper alignment film 55 covering a whole area including the transparent common electrode 54 are disposed. Reference numeral $53_R$ illustrated in FIG. 18 denotes a red filter, reference numeral $53_G$ illustrated in FIG. 19 denotes a green filter, and reference numeral $53_B$ illustrated in FIG. 20 denotes a blue filter. Also, reference numeral $53_W$ illustrated in FIG. 19 and FIG. 20 denotes a white filter.

Operation of the reflective subpixel is the same as that described in the first embodiment. Operation of the transmissive subpixel is the same as that described in the second embodiment.

The TFT functions as a switching element operating in accordance with a signal from the scanning line 22. As illustrated in FIG. 18, the pixel electrode 30B of the subpixel $12B_R$ and the pixel electrode 30A of the subpixel $12A_R$ are integrally formed. On the basis of a TFT operation in accordance with a scanning signal from the scanning line 22, a voltage in accordance with a video signal $VS_R$ is applied to these pixel electrodes through the signal line 26 from the signal output circuit 202.

Also, as illustrated in FIG. 19, a pixel electrode 30B" of the subpixel $12B_W$ and a pixel electrode 30A" of the subpixel $12A_G$ are integrally formed. On the basis of a TFT operation in accordance with a scanning signal from the scanning line 22, a voltage in accordance with a video signal $VS_G$ is applied to these pixel electrodes through the signal line 26 from the signal output circuit 202.

On the other hand, as illustrated in FIG. 20, a pixel electrode 30B" of the subpixel $12B_W$ is formed independently of the pixel electrode 30A" of the subpixel $12A_B$. On the basis of a TFT operation in accordance with a scanning signal from the scanning line 22, a voltage in accordance with a video signal $VS_B$ is applied to the pixel electrode 30A" through the signal line 26 from the signal output circuit 202.

And as illustrated in FIG. 17, the pixel electrode 30B" illustrated in FIG. 19 and the pixel electrode 30B" illustrated in FIG. 20 are integrally formed. Accordingly, as described with reference to FIG. 19, a voltage in accordance with the video signal $VS_G$ is applied to the pixel electrode 30B" illustrated in FIG. 20.

Next, a description will be given of color gamut and luminance of an image displayed on the display apparatus 4.

For an image based on the reflective subpixels $12A_R$, $12A_G$ and $12A_B$, it is possible to display colors in an area of a triangle having vertices denoted by reference numerals R, G, and B illustrated in FIG. 5A from additive mixture of colors. On the other hand, for an image based on the transmissive subpixel $12B_R$ and $12B_W$, it is possible to display colors in a line segment connecting points denoted by reference numerals W and R in FIG. 5B from additive mixture of colors. In this regard, in the case of a configuration in which the color filter $53_W$ illustrated in FIGS. 19 and 20 is replaced by a color filter for displaying cyan, it is possible to display colors in a line segment connecting points denoted by reference numerals C and R illustrated in FIG. 5B from additive mixture of colors.

Accordingly, it is possible for the display apparatus 4 to display a favorable image by additive mixture of the three primary colors at the time of operating as a reflective type, and to display images having higher luminance while ensuring a certain degree of color gamut at the time of operating as a transmissive type.

Fifth Embodiment

A description will be given of a display apparatus according to a fourth embodiment of the present disclosure. In the fifth embodiment, the configuration of the transmissive subpixels for displaying white color is different from the fourth embodiment.

In a schematic perspective view of a display apparatus according to the fifth embodiment, the subpixels $12B_W$ illustrated in FIG. 15 ought to be changed for subpixels $12B_{W1}$ and $12B_{W2}$, the display section 410 ought to be changed for a display section 510, and the display apparatus 4 ought to be changed for a display apparatus 5.

In the display section 510, a pixel 12 includes a first transmissive subpixel $12B_{W1}$ and a second transmissive subpixel $12B_{W2}$ for displaying white color.

A description will be given of details of the subpixels according to the fifth embodiment.

Figure 21:
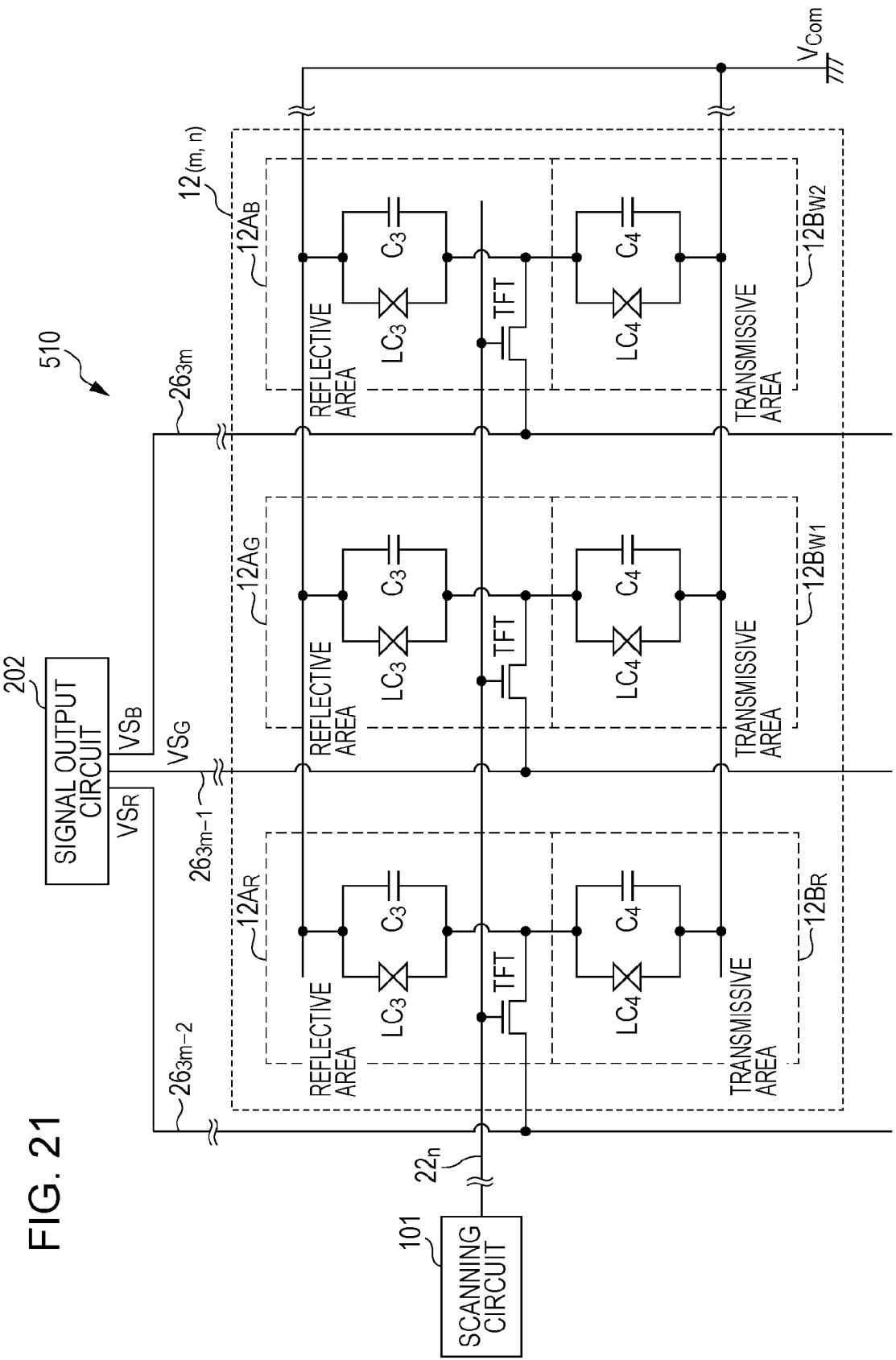
FIG. 21 is a schematic circuit diagram of a display section of a portion including a (m, n)-th pixel in a display apparatus according to a fifth embodiment.

FIG. 21 is a schematic circuit diagram of a display section of a portion including a (m, n)-th pixel according to the fifth embodiment.

A scanning line $22_n$ of an n-th row is connected to a pixel $12_{(m,\ n)}$. A signal line $26_{3m-2}$ of a (3×m−2)-th column is connected to a subpixel $12A_R$ and a subpixel $12B_R$. A signal line $26_{3m-1}$ of a (3×m−1)-th column is connected to a subpixel $12A_G$ and a subpixel $12B_{W1}$. A signal line $26_{3m}$ of a (3×m)-th column is connected to a subpixel $12A_B$ and a subpixel $12B_{W2}$.

The liquid crystal capacitors $LC_3$ and $LC_4$, and the retention capacitors $C_3$ and $C_4$, illustrated in FIG. 21, have basically the same configurations as those described in the second embodiment with reference to FIG. 7, and thus the description thereof will be omitted.

Signals in accordance with a color image to be displayed are supplied to the display apparatus 5 from the outside. A video signal $VS_R$ for displaying red color, a video signal $VS_G$ for displaying green color and a video signal $VS_B$ for displaying blue color are generated by a circuit, not illustrated in the figure, on the basis of the signal according to the color image. And the signal output circuit 202 drives the reflective subpixel $12A_R$ and the transmissive subpixel $12B_R$ for displaying red color using the video signal $VS_R$ for displaying red color. The signal output circuit 202 drives the reflective subpixel $12A_G$ for displaying green color and the first transmissive subpixel $12B_{W1}$ for displaying white color using the video signal $VS_G$ for displaying green color. And the signal output circuit 202 drives the reflective subpixel $12A_B$ for displaying blue color and the second transmissive subpixel $12B_{W2}$ for displaying white color using the video signal $VS_B$ for displaying blue color.

Figure 22:
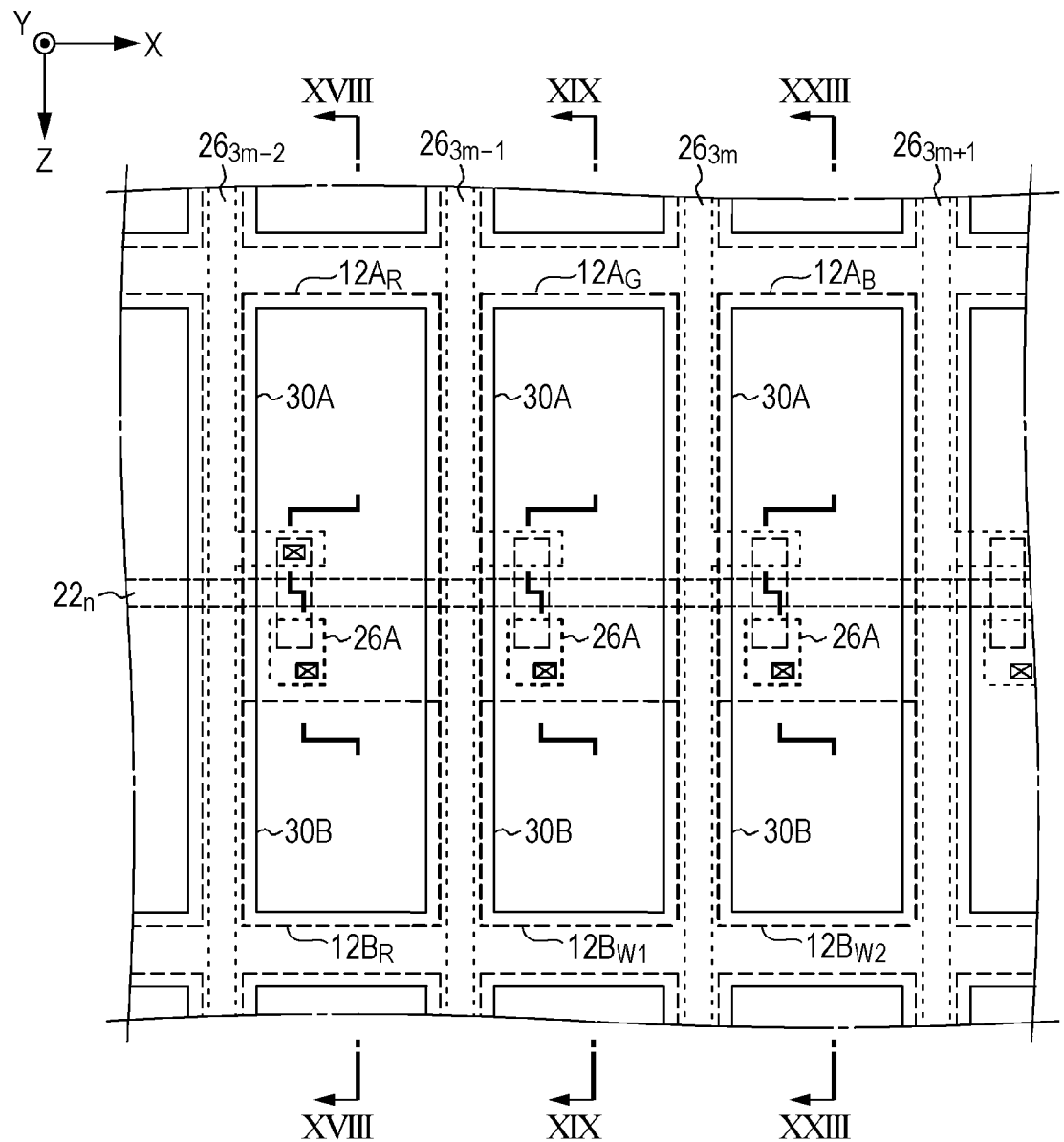
FIG. 22 is a schematic plan view for explaining arrangement of various components in the display section of the portion including the (m, n)-th pixel.

FIG. 22 is a schematic plan view for explaining arrangement of various components in the display section of the portion including the (m, n)-th pixel.

FIG. 23 is a schematic sectional view of the display section taken on line XXIII-XXIII of FIG. 22. In this regard, a schematic sectional view of the display section taken on line XVIII-XVIII of FIG. 22 is the same as that in FIG. 18. Also, a schematic sectional view of the display section taken on line XIX-XIX of FIG. 22 ought to be obtained by changing reference numeral $12B_W$ for reference numeral $12B_{W1}$ in FIG. 19.

Operation of the display apparatus 5 is the same as described in the fourth embodiment except that a transmissive subpixel $12B_{W2}$ for white color is driven by the video signal $VS_B$ for displaying blue color.

As illustrated in FIG. 17, in the display section 410 according to the fourth embodiment, it is necessary that the individual pixel electrodes are different in planar shape. In contrast, in the display section 510 according to the fifth embodiment, it is possible for the individual pixel electrodes to have a same planar shape. Accordingly, the fifth embodiment has an advantage in that the display section 510 is easy to manufacture.

In the above, descriptions have been specifically given of the embodiments of the present disclosure. However, the present disclosure is not limited to the above-described embodiments. Various variations are possible within the spirit and scope of this disclosure.

In this regard, in the present disclosure, it is also possible to employ configurations described as follows.

(1) A display apparatus including
a display section including an array of pixels in a two-dimensional matrix,
wherein each of the pixels of the display section includes a pair of a subpixel displaying a first primary color, and a subpixel displaying a second primary color being different from the first primary color.

(2) The display apparatus according to (1),
wherein the first primary color is red.

(3) The display apparatus according to (1) or (2),
wherein the second primary color is white or cyan.

(4) The display apparatus according to any one of (1) to (3),
wherein the subpixel displaying the first primary color is driven using a video signal for displaying red color, and the subpixel displaying the second primary color is driven using a video signal for displaying green color.

(5) The display apparatus according to any one of (1) to (4),
wherein the display section includes a liquid-crystal display panel.

(6) A display apparatus including
a transflective display section including, in a two-dimensional matrix, an array of pixels including a pair of a transmissive subpixel for displaying red color, a transmissive subpixel for displaying green color and a transmissive subpixel for displaying blue color, and a reflective subpixel for displaying red color and a reflective subpixel for displaying white color or cyan.

(7) The display apparatus according to (6),
wherein the transmissive subpixel for displaying red color and the reflective subpixel for displaying red color are driven using a video signal for displaying red color,
the transmissive subpixel for displaying green color and the reflective subpixel for displaying white color or cyan are driven using a video signal for displaying green color, and
the transmissive subpixel for displaying blue color is driven using a video signal for displaying blue color.

(8) The display apparatus according to (6),
wherein the pixels are provided with a first reflective subpixel and a second reflective subpixel for displaying white color or cyan,
the transmissive subpixel for displaying red color and the reflective subpixel for displaying red color are driven using a video signal for displaying red color,
the transmissive subpixel for displaying green color and the first reflective subpixel for displaying white color or cyan are driven using a video signal for displaying green color, and
the transmissive subpixel for displaying blue color and the second reflective subpixel for displaying white color or cyan are driven using a video signal for displaying blue color.

(9) The display apparatus according to any one of (6) to (8),
wherein the display section includes a transflective liquid-crystal display panel.

(10) A display apparatus including
a transflective display section including, in a two-dimensional matrix, an array of pixels including a pair of a reflective subpixel for displaying red color, a reflective subpixel for displaying green color and a reflective subpixel for displaying blue color, and a transmissive subpixel for displaying red color and a transmissive subpixel for displaying white color or cyan.

(11) The display apparatus according to (10), wherein the reflective subpixel for displaying red color and the transmissive subpixel for displaying red color are driven using a video signal for displaying red color, the reflective subpixel for displaying green color and the transmissive subpixel for displaying white color or cyan are driven using a video signal for displaying green color, and the reflective subpixel for displaying blue color is driven using a video signal for displaying blue color.

(12) The display apparatus according to (10), wherein the pixels are provided with a first transmissive subpixel and a second transmissive subpixel for displaying white color or cyan, the reflective subpixel for displaying red color and the transmissive subpixel for displaying red color are driven using a video signal for displaying red color, the reflective subpixel for displaying green color and the first transmissive subpixel for displaying white color or cyan are driven using a video signal for displaying green color, and the reflective subpixel for displaying blue color and the second transmissive subpixel for displaying white color or cyan are driven using a video signal for displaying blue color.

(13) The display apparatus according to any one of (10) to (12), wherein the display section includes a transflective liquid-crystal display panel.

The present disclosure contains subject matter related to that disclosed in Japanese Priority Patent Application JP 2011-100516 filed in the Japan Patent Office on Apr. 28, 2011, the entire contents of which are hereby incorporated by reference.

What is claimed is:

1. A display apparatus comprising
  a transreflective display section including a liquid crystal panel comprising (a) pixels arrayed in a two-dimensional matrix, (b) a plurality of scan lines, and (c) a plurality of signal data lines;
  a scanning circuit connected to the plurality of scan lines to supply scanning signals; and
  a signal output circuit connected to the plurality of signal data lines to supply video signals for displaying a first color, a second color, and a third color,
  wherein, each of the pixels of the liquid crystal panel includes:
  (1) subpixels including (a) a first transmissive subpixel comprising a first color filter, (b) a second subpixel comprising a second color filter, (c) a third subpixel comprising a third color filter, (d) a first reflective subpixel comprising a first color filter, (e) a fourth subpixel comprising a fourth color filter, and (f) a fifth subpixel comprising a fourth color filter, where (i) the second subpixel and the third subpixel are both transmissive subpixels and the fourth subpixel and the fifth subpixel are both reflective subpixels, or (ii) the second subpixel and the third subpixel are both reflective subpixels and the fourth subpixel and the fifth sub pixel are both transmissive subpixels;
  (2) a first transistor that connects a first signal line for supplying a video signal for displaying the first color to a pixel electrode of the first transmissive subpixel and a pixel electrode of the first reflective subpixel in response to an application of a respective scanning signal from a scanning line to a gate electrode of the first transistor;
  (3) a second transistor that connects a second signal line to supply a video signal for displaying the second color to a pixel electrode of the second subpixel and a pixel electrode of the fourth subpixel in response to the application of the respective scanning signal from the scanning line to a gate electrode of the second transistor; and
  (4) a third transistor that connects a third signal line for supplying a video signal for displaying the third color to a pixel electrode of the third subpixel and a pixel electrode of the fifth subpixel in response to the application of a respective scanning signal from the scanning line to a gate electrode of the third transistor, and
  wherein, the first, second, third, and fourth colors are different from each other.

2. The display apparatus of claim 1, wherein the second subpixel and the third subpixel are both transmissive subpixels and the fourth subpixel is a reflective subpixel.

3. The display apparatus of claim 1, wherein the second subpixel and the third subpixel are both reflective subpixels and the fourth subpixel is a transmissive subpixel.

4. The display apparatus of claim 1, wherein an area of the first transmissive subpixel is different than an area of the fourth subpixel.

5. The display apparatus of claim 4, wherein the area of the first transmissive subpixel is smaller than the area of the fourth subpixel.

6. The display apparatus of claim 1, wherein an area of the first reflective subpixel is different than an area of the fourth subpixel.

7. The display apparatus of claim 6, wherein the area of the first reflective subpixel is smaller than the area of the fourth subpixel.

8. The display apparatus of claim 1, wherein the first color is red.

9. The display apparatus of claim 1, wherein the second color is green.

10. The display apparatus of claim 1, wherein the third color is blue.

11. The display apparatus of claim 1, wherein the fourth color is white.

12. A display apparatus comprising
  a transreflective display section including a liquid crystal panel comprising (a) pixels arrayed in a two-dimensional matrix, (b) a plurality of scan lines, and (c) a plurality of signal data lines;
  a scanning circuit connected to the plurality of scan lines to supply scanning signals; and
  a signal output circuit connected to the plurality of signal data lines to supply video signals for displaying a first color, a second color, and a third color,
  wherein, each of the pixels of the liquid crystal panel includes:
  (1) subpixels including (a) a first transmissive subpixel comprising a first color filter, (b) a second subpixel comprising a second color filter, (c) a third subpixel comprising a third color filter, (d) a first reflective subpixel comprising a first color filter, and (e) a fourth subpixel comprising a fourth color filter, where (i) the second subpixel and the third subpixel are both transmissive subpixels and the fourth subpixel is a reflective subpixel, or (ii) the second subpixel and the third subpixel are both reflective subpixels and the fourth subpixel is a transmissive subpixel;

(2) a first transistor that connects a first signal line for supplying a video signal for displaying the first color to a pixel electrode of the first transmissive subpixel and a pixel electrode of the first reflective subpixel in response to an application of a respective scanning signal from a scanning line to a gate electrode of the first transistor;

(3) a second transistor that connects a second signal line to supply a video signal for displaying the second color to a pixel electrode of the second subpixel and a pixel electrode of the fourth subpixel in response to the application of the respective scanning signal from the scanning line to a gate electrode of the second transistor; and (4) a third transistor that connects a third signal line for supplying a video signal for displaying the third color to a pixel electrode of the third subpixel in response to the application of a respective scanning signal from the scanning line to a gate electrode of the third transistor, the third transistor connecting the third signal line only to the pixel electrode of the third subpixel, and wherein, the first, second, third, and fourth colors are different from each other.

* * * * *